United States Patent
Lin et al.

(10) Patent No.: US 12,232,128 B2
(45) Date of Patent: Feb. 18, 2025

(54) UPLINK INFORMATION FEEDBACK RESOURCE DETERMINATION METHOD AND DEVICE

(71) Applicant: ZTE CORPORATION, Shenzhen (CN)

(72) Inventors: Wei Lin, Shenzhen (CN); Peng Hao, Shenzhen (CN); Wei Gou, Shenzhen (CN); Xianghui Han, Shenzhen (CN); Yu Ngok Li, Hong Kong (CN)

(73) Assignee: ZTE CORPORATION, Shenzhen (CN)

( * ) Notice: Subject to any disclaimer, the term of this patent is extended or adjusted under 35 U.S.C. 154(b) by 657 days.

(21) Appl. No.: 17/611,493

(22) PCT Filed: May 15, 2020

(86) PCT No.: PCT/CN2020/090414
§ 371 (c)(1),
(2) Date: May 19, 2022

(87) PCT Pub. No.: WO2020/228804
PCT Pub. Date: Nov. 19, 2020

(65) Prior Publication Data
US 2022/0287068 A1 Sep. 8, 2022

(30) Foreign Application Priority Data
May 15, 2019 (CN) .......................... 201910403610.9

(51) Int. Cl.
H04W 72/23 (2023.01)
H04L 1/1812 (2023.01)
(Continued)

(52) U.S. Cl.
CPC ........... *H04W 72/23* (2023.01); *H04L 1/1812* (2013.01); *H04L 5/0057* (2013.01); *H04W 72/21* (2023.01)

(58) Field of Classification Search
None
See application file for complete search history.

(56) References Cited

U.S. PATENT DOCUMENTS 11,277,883 B2 * 3/2022 Talarico ................ H04L 1/1887
2017/0367046 A1 12/2017 Papasakellariou
(Continued)

FOREIGN PATENT DOCUMENTS

| CN | 102316526 A | 1/2012 |
| CN | 103684705 A | 3/2014 |

(Continued)

OTHER PUBLICATIONS

Chinese Search Report for Application No. 201910403610.9, dated Jun. 23, 2022, 5 pages including English translation.
(Continued)

*Primary Examiner* — Xavier S Wong
(74) *Attorney, Agent, or Firm* — Morgan, Lewis & Bockius LLP

(57) ABSTRACT

Provided are an uplink information feedback resource determination method and device. The uplink information feedback resource determination method includes: sending DCI to a terminal, where the DCI is used for scheduling downlink service data transmission and for requesting the terminal to feed back CSI, and the DCI includes indication information of a PUCCH resource occupied by the CSI and indication information of a PUCCH resource occupied by HARQ information of downlink service data; and receiving CSI and HARQ information sent by the terminal, where the PUCCH resource occupied by the CSI and the PUCCH resource (Continued)

occupied by the HARQ information are determined according to the indication information in the DCI.

19 Claims, 5 Drawing Sheets

(51) Int. Cl.
*H04L 5/00* (2006.01)
*H04W 72/21* (2023.01)

(56) References Cited

U.S. PATENT DOCUMENTS

| | | | | |
|---|---|---|---|---|
| 2019/0261310 | A1* | 8/2019 | Martin | H04W 72/0446 |
| 2020/0295903 | A1* | 9/2020 | Faxér | H04W 24/10 |

FOREIGN PATENT DOCUMENTS

| | | |
|---|---|---|
| CN | 104243108 A | 12/2014 |
| CN | 106993332 A | 7/2017 |
| CN | 108141791 A | 6/2018 |
| CN | 110535572 A | 12/2019 |
| WO | WO-2017218749 A1 | 12/2017 |
| WO | WO 2018/170916 A1 | 9/2018 |
| WO | WO2019/069234 A1 | 4/2019 |
| WO | WO 2019/098693 A1 | 5/2019 |

OTHER PUBLICATIONS

Chinese Office Action for Application No. 201910403610.9 dated Jun. 30, 2022, 14 pages including English Translation.

Evaluation of resource capacity of TD-LTE PDCCH, China Academic Journal Electronic Publishing House, http://www.cnkl.net, © 1994-2022, 3 pages including English Translation.

Intel Corporation, "Remaining Details on NR PUCCH", 3GPP TSG RAN WG1 Meeting #94 R1-1808673, Aug. 20-24, 2018, Gothenburg, Sweden, 6 pages.

International Search Report for Application No. PCT/CN2020/090414, dated Aug. 18, 2020, 4 pages including English translation.

NEC, "Remaining Issues on Non-codebook Based UL Transmission", *3GPP TSG RAN WG1 Meeting #93 R1-1806672*, May 25, 2018 (May 25, 2018), entire document.

Panasonic, "Discussion on DCI formats and A-CSI Reporting in Short-PUCCH", *3GPP TSG RAN WG1 91 R1-1720496*, Dec. 1, 2017 (Dec. 1, 2017), section 3.

Search Report for Chinese Application No. 2019104036109, dated May 4, 2023, 7 pages including translation.

Motorola, "DCI for uplink non-contiguous RB allocations," 3GPP TSG RAN1 #56bis, R1-091349, Seoul, Korea, Mar. 23-27, 2009, 5 pages.

Huawei et al., "On remaining details for beamformed CSI-RS", 3GPP TSG RAN WG1 Meeting #88, R1-1703061, Athens, Greece Feb. 13-17, 2017, 3 pages.

Ericsson, "On aperiodic and semi-persistent CSI reporting on PUCCH", 3GPP TSG RAN WG1 Meeting 90bis, R1-1718443, Prague, CZ, Oct. 9-13, 2017, 3 pages.

CATT, "UL control enhancements for URLLC," 3GPP TSG RAN WG1 Meeting #95, R1-1812629, Spokane, USA, Nov. 12-16, 2018, 7 pages.

Extended European Search Report for Application No. 20806906.2, dated Dec. 23, 2022, 9 pages.

Australian Office Action for Application No. 2020276805 dated Nov. 29, 2022, 7 pages.

Hauwei et al., "CSI Feedback Enhancements for URLLC", 3GPP TSG RAN WG1 Meeting #92bis R1-1804289, Sanya, China, Apr. 16-20, 2018, 5 pages.

CATT, "UL Control enhancements for URLLC", 3GPP TSG RAN WG1 Meeting #96 R1-1902003, Athens, Greece, Feb. 1-Mar. 1, 2019, 8 pages.

\* cited by examiner

Receive DCI sent by a base station, where the DCI is used for scheduling downlink service data and requesting CSI feedback, the DCI includes indication information of both a scheduling unit where the HARQ information is located, and a scheduling unit where the CSI is located, and indication information of both a PUCCH resource used by the HARQ information in the scheduling unit, and a PUCCH resource used by the CSI in the scheduling unit, and the scheduling unit where the CSI is located is the same as the scheduling unit where the HARQ information is located ~S7010

Feed back the CSI and the HARQ information to the base station, where the PUCCH resource occupied by the CSI and the PUCCH resource occupied by the HARQ information are determined according to the indication information in the DCI ~S7020

FIG. 7

Receive X DCIs sent by a terminal, where the X DCIs are used for scheduling downlink service data and Y DCIs in the X DCIs request that the terminal feed back CSIs, where $X \geq 1$, $X \geq Y \geq 0$, X and Y are integers, CSIs and HARQ information corresponding to the X DCIs are fed back by using the same PUCCH resource, and the PUCCH resource used by the CSIs and the HARQ information corresponding to the X DCIs is determined according to the minimum feedback timing of the CSIs and the HARQ information corresponding to the X DCIs and the total feedback overhead of the CSIs and the HARQ information corresponding to the X DCIs ~S8010

Send the CSIs and the HARQ information corresponding to the X DCIs to the base station on the same PUCCH resource ~S8020

FIG. 8

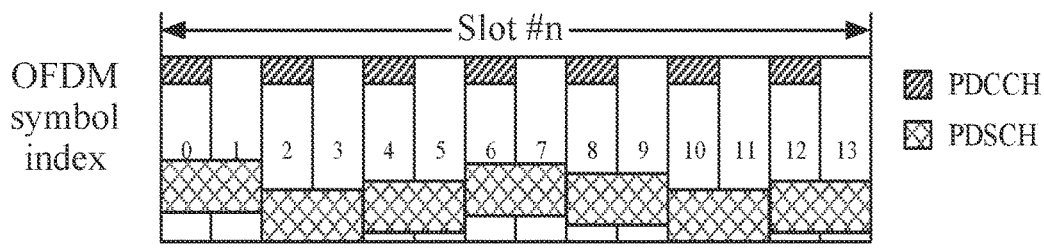

FIG. 9

UPLINK INFORMATION FEEDBACK RESOURCE DETERMINATION METHOD AND DEVICE

CROSS-REFERENCE TO RELATED APPLICATIONS

This is a National Stage Application filed under 35 U.S.C. 371 based on International Patent Application No. PCT/CN2020/090414, filed on May 15, 2020, which claims priority to Chinese Patent Application No. 201910403610.9 filed on May 15, 2019, the disclosures of both of which are incorporated herein by reference in their entireties.

TECHNICAL FIELD

The present application relates to wireless communications networks, for example, an uplink information feedback resource determination method and device.

BACKGROUND

In a wireless communication network, a base station can request feedback of channel state information (CSI) while scheduling service data through downlink control information (DCI). Meanwhile, a user equipment (UE) (also called terminal) needs to feed back an acknowledgement (ACK)/non-acknowledgement (NACK) information in a hybrid automatic repeat request (HARQ) protocol for the service data. The UE needs to feed back CSI and an HARQ information to the base station on a physic uplink control channel (PUCCH), but how to determine the PUCCH resources occupied by the CSI and the HARQ information is an urgent problem to be solved at present.

SUMMARY

The present application provides an uplink information feedback resource determination method and device for defining uplink resources occupied by CSI and HARQ information, so as to avoid the problem that a base station fails to correctly receive CSI or HARQ information fed back by a UE.

The embodiments of the present application provide an uplink information feedback resource determination method. The method includes the steps described below.

DCI is sent to a terminal, where the DCI is used for scheduling downlink service data and for requesting the terminal to feed back CSI, and the DCI includes indication information of both a PUCCH resource occupied by the CSI and a PUCCH resource occupied by HARQ information for the downlink service data.

The CSI and the HARQ information sent by the terminal are received, where the PUCCH resource occupied by the CSI and the PUCCH resource occupied by the HARQ information are determined according to the indication information in the DCI.

The embodiments of the present application provide an uplink information feedback resource determination method. The method includes the steps described below.

DCI sent by a base station is received, where the DCI is used for scheduling downlink service data and requesting CSI feedback, and the DCI includes indication information of both a PUCCH resource occupied by the CSI and a PUCCH resource occupied by HARQ information for the downlink service data.

The CSI and the HARQ information are fed back to the base station, where the PUCCH resource occupied by the CSI and the PUCCH resource occupied by the HARQ information are determined according to the indication information in the DCI.

The embodiments of the present application provide a reference signal request indication method. The method includes the steps described below.

An uplink DCI or a downlink DCI is sent to a terminal, where the uplink DCI or the downlink DCI is used for indicating a sounding reference signal (SRS) request and a CSI request, and the SRS request and the CSI request are requested according to the same request state or two different request states.

The embodiments of the present application provide a reference signal request indication method. The method includes the steps described below.

An uplink DCI or a downlink DCI sent by a base station is received, where the uplink DCI or the downlink DCI is used for indicating an SRS request and a CSI request, and the SRS request and the CSI request share a bit field.

An SRS and CSI corresponding to a state of the bit field shared by the SRS request and the CSI request are sent to the base station.

The embodiments of the present application provide an uplink information feedback resource determination device. The device includes a sending module and a receiving module.

The sending module is configured to send DCI to a terminal, where the DCI is used for scheduling downlink service data and for requesting the terminal to feed back CSI, and the DCI includes indication information of both a PUCCH resource occupied by the CSI and a PUCCH resource occupied by HARQ information for the downlink service data.

The receiving module is configured to receive the CSI and the HARQ information sent by the terminal, where the PUCCH resource occupied by the CSI and the PUCCH resource occupied by the HARQ information are determined according to the indication information in the DCI.

The embodiments of the present application provide an uplink information feedback resource determination device. The device includes a receiving module and a sending module.

The receiving module is configured to receive DCI sent by a base station, where the DCI is used for scheduling downlink service data and requesting CSI feedback, and the DCI includes indication information of both a PUCCH resource occupied by the CSI and a PUCCH resource occupied by HARQ information for the downlink service data.

The sending module is configured to feed back the CSI and the HARQ information to the base station, where the PUCCH resource occupied by the CSI and the PUCCH resource occupied by the HARQ information are determined according to the indication information in the DCI.

The embodiments of the present application provide a reference signal request indication device. The device includes a sending module.

The sending module is configured to send an uplink DCI or a downlink DCI to a terminal, where the uplink DCI or the downlink DCI is used for indicating an SRS request and a CSI request, and the SRS request and the CSI request are requested according to the same request state or two different request states.

The embodiments of the present application provide a reference signal request indication device. The device includes a receiving module and a sending module.

The receiving module is configured to receive an uplink DCI or a downlink DCI sent by a base station, where the uplink DCI or the downlink DCI is used for indicating an SRS request and a CSI request, and the SRS request and the CSI request share a bit field.

The sending module is configured to send an SRS and CSI corresponding to a state of the bit field shared by the SRS request and the CSI request to the base station.

BRIEF DESCRIPTION OF DRAWINGS

FIG. 7 is a flowchart of another uplink information feedback resource determination method according to an embodiment;

FIG. 8 is a flowchart of another uplink information feedback resource determination method according to an embodiment;

FIG. 9 is a schematic diagram of time-domain resource occupancy;

DETAILED DESCRIPTION

Embodiments of the present application are described hereinafter in detail in conjunction with the drawings.

Figure 1:
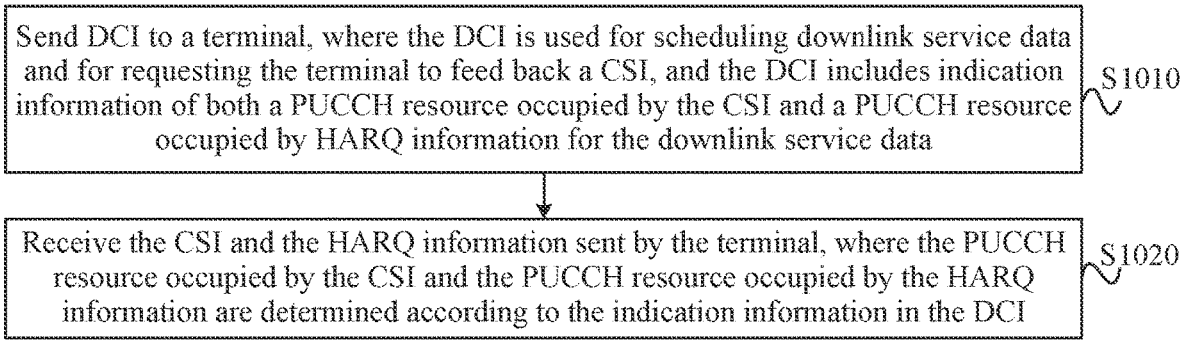
FIG. 1 is a flowchart of an uplink information feedback resource determination method according to an embodiment.

FIG. 1 is a flowchart of an uplink information feedback resource determination method according to an embodiment. As shown in FIG. 1, the method provided by this embodiment includes steps S1010 and S1020.

In S1010, DCI is sent to a terminal, where the DCI is used for scheduling downlink service data and for requesting the terminal to feed back CSI, and the DCI includes indication information of both a PUCCH resource occupied by the CSI and a PUCCH resource occupied by HARQ information for the downlink service data.

The uplink information feedback resource determination method provided by this embodiment is applied to a base station device in a wireless communication system, which is simply referred to as the base station. The base station allocates various transmission resources to a terminal and sends a variety of configuration information to the terminal so that the terminal determines resources used for transmission and various measurement or transmission information to be executed.

A base station schedules downlink service data through DCI, and meanwhile, the base station may also request that a UE perform CSI feedback through the DCI. After the UE receives the downlink data scheduled by the base station through the DCI, the UE needs to feed back HARQ information to the base station according to a decoding result of the decoding of the downlink service data. The HARQ information includes an ACK or a NACK. If the UE correctly decodes the downlink service data, the HARQ information fed back is an ACK, and if the UE incorrectly decodes the downlink service data, the HARQ information feedback is a NACK. If the DCI requests CSI feedback while scheduling the downlink service data, the UE determines whether the HARQ information fed back is an ACK or a NACK according to the decoding result of the downlink service data scheduled by the DCI, the UE needs to perform CSI feedback for the DCI, and the UE determines a scheduling unit where the HARQ information feedback and the CSI feedback are performed according to a timing relationship indicated by the DCI. The DCI includes indication information of a PUCCH resource occupied by the CSI and indication information of a PUCCH resource occupied by the HARQ information of the service data. The scheduling unit where the CSI is located and the scheduling unit where the HARQ information of the service data is located in the DCI may be the same or may be different.

In this embodiment of the present application, the scheduling unit where the HARQ information feedback and the CSI feedback are performed includes at least one of: a subframe, a slot, a non-slot that is smaller than a slot, a short transmission time interval (sTTI), or a symbol. That is, the base station may indicate that the CSI and the HARQ are transmitted in a scheduling unit of any one of the above granularities through the DCI. Embodiments of the present application are illustrated by using an example where the scheduling unit is a slot.

In step S1020, the CSI and the HARQ information sent by the terminal are received, where the PUCCH resource occupied by the CSI and the PUCCH resource occupied by the HARQ information are determined according to the indication information in the DCI.

After the UE receives the DCI, the UE performs CSI request detection and determines the HARQ information for the downlink service data. Then according to the PUCCH resource occupied by the CSI and the PUCCH resource occupied by the HARQ information for the downlink service data, which are indicated in the DCI, the UE detects that a CSI request exists in the DCI, and the UE sends the CSI feedback and the HARQ information for the downlink service data to the base station through the determined PUCCH resources. Then the base station may perform the receiving of the CSI and the HARQ information on the determined PUCCH resources. Since the base station indicates the PUCCH resource occupied by the CSI and the PUCCH resource occupied by the HARQ information through the DCI, when the DCI sent by the base station requests CSI feedback while scheduling the downlink service data, the UE may perform the feedback of the CSI and the HARQ information on the determined PUCCH resources, thereby avoiding the problem that the base station fails to correctly receive the CSI or HARQ information fed back by the UE.

In the uplink information feedback resource determination method provided by this embodiment, DCI used for scheduling downlink service data and requesting that a terminal feed back CSI is sent to the terminal, where the DCI includes indication information of both a PUCCH resource occupied by the CSI and a PUCCH resource occupied by HARQ information for the downlink service data, and then the CSI and the HARQ information sent by the terminal are received, where the PUCCH resource occupied by the CSI and the PUCCH resource occupied by the HARQ information are determined according to the indication information in the DCI. Since the PUCCH resources used by the terminal to feedback the CSI and the HARQ information are determined according to the DCI configuration, the PUCCH resources occupied by the CSI and HARQ information are defined, thereby avoiding the problem that the base station fails to correctly receive the CSI or HARQ information fed back by the UE.

The base station may receive the CSI and the HARQ information sent by the UE in the same scheduling unit, or the base station may receive the CSI and the HARQ information sent by the UE in different scheduling units. The scheduling of the CSI and the HARQ information by the base station in different manners will be described in detail below respectively through embodiments.

Figure 2:
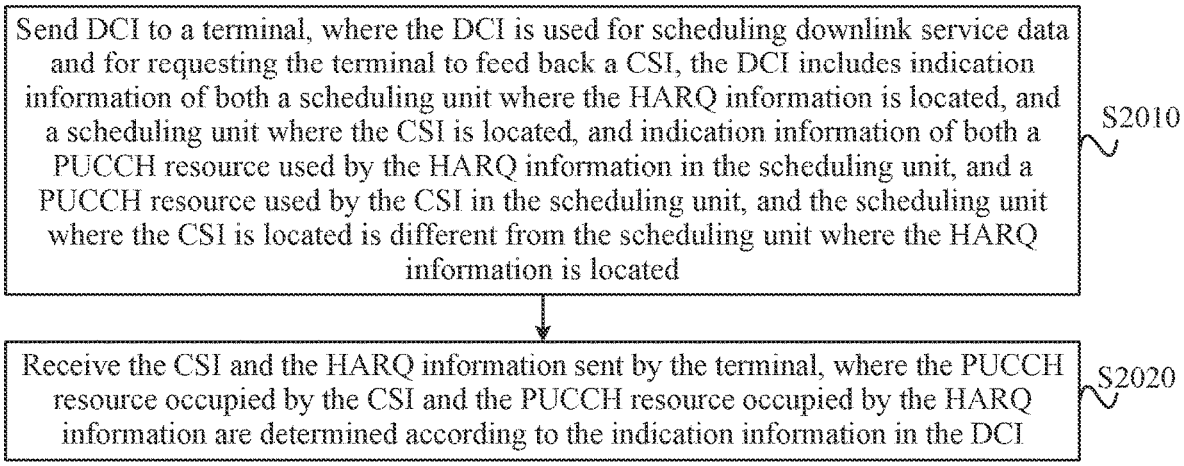
FIG. 2 is a flowchart of another uplink information feedback resource determination method according to an embodiment.

FIG. 2 is a flowchart of another uplink information feedback resource determination method according to an embodiment. As shown in FIG. 2, the method provided by this embodiment includes steps S2010 and S2020.

In step S2010, DCI is sent to a terminal, where the DCI is used for scheduling downlink service data and for requesting the terminal to feed back CSI, the DCI includes indication information of both a scheduling unit where the HARQ information is located, and a scheduling unit where the CSI is located, and indication information of both a PUCCH resource used by the HARQ information in the scheduling unit, and a PUCCH resource used by the CSI in the scheduling unit, and the scheduling unit where the CSI is located is different from the scheduling unit where the HARQ information is located.

In this embodiment, the DCI sent by a base station to the terminal includes indication information of both a scheduling unit where the HARQ information is located, and a scheduling unit where the CSI is located, and indication information of both a PUCCH resource used by the HARQ information in the scheduling unit, and a PUCCH resource used by the CSI in the scheduling unit, and the scheduling unit where the CSI is located is different from the scheduling unit where the HARQ information is located.

Generally, the scheduling unit used by the base station to schedule a UE includes multiple PUCCH resources. For example, when the scheduling unit is a slot, in order to avoid the mutual influence between the CSI and the HARQ information fed back by the UE, the scheduling units used by the CSI and the HARQ information may be different. Therefore, the DCI sent by the base station to the UE needs to include indication information of the scheduling unit where the HARQ information is located, indication information of the scheduling unit where the CSI is located, indication information of an uplink resource used by the HARQ information in the scheduling unit, and indication information of an uplink resource used by the CSI in the scheduling unit.

For example, when the scheduling unit is a slot, the UE completes the receiving of a physical downlink Shared channel (PDSCH) scheduled by the DCI in slot n. The downlink service data is carried on the PDSCH, and the DCI indicates a timing interval K1 between the scheduling unit where the HARQ information is located and a scheduling unit where downlink service data carried on the PDSCH is located after the end of receiving and a PUCCH resource index (PRI) used for HARQ information feedback, where the unit of K1 is slot. HARQ information of the PDSCH is determined to be fed back in slot n+K1 through K1. A PUCCH resource set (PUCCH set) used for HARQ information feedback is determined according to the feedback overhead of the HARQ information, and an index of a specific PUCCH resource used for HARQ information feedback in the PUCCH set is further determined according to the PRI indicated by the DCI. For CSI feedback requested by the DCI, the slot where the CSI feedback is performed and the PUCCH resource used for the CSI feedback may be determined by using any one of the following methods.

In an embodiment, the DCI includes a timing interval K1 between the scheduling unit where the HARQ information is located and a scheduling unit where the downlink service data reception ends, an offset value, a PRI of the PUCCH resource used by the HARQ information in the scheduling unit in a PUCCH set, and a PRI of the PUCCH resource used by the CSI in the scheduling unit in a PUCCH set. The PUCCH set used by the HARQ information in the scheduling unit and the PUCCH set used by the CSI in the scheduling unit are respectively determined according to the overhead of the HARQ information and the overhead of the CSI, and the scheduling unit where the CSI is located is the scheduling unit where the HARQ information is located plus the offset value, that is, the scheduling unit where the CSI is located is indicated by the timing interval K1 between the scheduling unit where the HARQ information is located and the scheduling unit where the downlink service data reception ends plus the offset value. Therefore, the HARQ information is fed back in slot n+K1, and the CSI is fed back in slot n+K1+offset value. The PUCCH set used for HARQ information feedback and the PUCCH set used for CSI feedback are respectively determined according to the overhead of the HARQ information and the overhead of the CSI, and since the overhead of the HARQ information is different from the overhead of the CSI, the PUCCH set used by the HARQ information is also different from the PUCCH set used by the CSI. Both the HARQ information and the CSI use PRIs to indicate the specific PUCCH resources in the determined PUCCH sets. In addition, the DCI may also not include an offset value, and the base station configures an offset value for the terminal through a radio resource control (RRC) signaling.

For example, the value of K1 is 4, the value of PRI is 1, and the value of offset value is 1. The HARQ information corresponding to the PDSCH scheduled by the DCI is fed back in slot n+4, the PUCCH set used by the HARQ information is selected according to the feedback overhead of the HARQ information, and the HARQ information is fed back by using a PUCCH resource with an index of 1 in the selected PUCCH set. The CSI requested by the DCI is fed back in slot n+5, the PUCCH set used for CSI feedback is selected according to the feedback overhead of the CSI, and the CSI is fed back by using a PUCCH resource with an index of 1 in the selected PUCCH set.

In an embodiment, the DCI includes a timing interval K1 between the scheduling unit where the HARQ information is located and a scheduling unit where the downlink service data reception ends, an offset value, and a PRI of the PUCCH resource used by the HARQ information in the scheduling unit in a PUCCH set. The PUCCH set used by the HARQ information in the scheduling unit and the PUCCH set used by the CSI in the scheduling unit are respectively determined according to the overhead of the HARQ information and the overhead of the CSI, the scheduling unit where the CSI is located is the scheduling unit where the HARQ information is located plus the offset value, and the PRI of the PUCCH resource used by the CSI in the scheduling unit in the PUCCH resource set is the PRI of the PUCCH resource used by the HARQ information in the scheduling unit in the PUCCH resource set plus the offset value. That is, the scheduling unit where the CSI feedback is performed is indicated by the timing interval K1 between the scheduling unit where the HARQ information is located and the scheduling unit where the downlink service data reception ends plus the offset value. Therefore, the HARQ information is fed back in slot n+K1, and the CSI is fed back in slot n+K1+offset value. The PUCCH set used for HARQ information feedback and the PUCCH set used for CSI feedback are respectively determined according to the overhead of the HARQ information and the overhead of the CSI, and since the overhead of the HARQ information is different from the overhead of the CSI, the PUCCH set used by the HARQ information is also different from the PUCCH set used by the CSI. The HARQ information uses the PRI to indicate the specific PUCCH resource in the determined PUCCH set, and the CSI uses PRI+offset value to indicate the specific PUCCH resource in the determined PUCCH set. In addition, the DCI may also not include an offset value, and the base station configures an offset value for the terminal through an RRC signaling.

For example, the value of K1 is 4, the value of PRI is 1, and the value of offset value is 1. The HARQ information corresponding to the PDSCH scheduled by the DCI is fed back in slot n+4, the PUCCH set used by the HARQ information is selected according to the feedback overhead of the HARQ information, and the HARQ information is fed back by using a PUCCH resource with an index of 1 in the selected PUCCH set. The CSI requested by the DCI is fed back in slot n+5, the PUCCH set used for CSI feedback is selected according to the feedback overhead of the CSI, and the CSI is fed back by using a PUCCH resource with an index of 2 in the selected PUCCH set.

In an embodiment, the DCI includes a timing interval K1 between the scheduling unit where the HARQ information is located and the scheduling unit where the downlink service data reception ends, a timing interval K1' between the scheduling unit where the CSI is located and the scheduling unit where the downlink service data reception ends, a PRI of the PUCCH resource used by the HARQ information in the scheduling unit in a PUCCH set, and a PRI' of the PUCCH resource used by the CSI in the scheduling unit in a PUCCH set. The PUCCH set used by the HARQ information in the scheduling unit and the PUCCH set used by the CSI in the scheduling unit are determined according to the overhead of the HARQ information and the overhead of the CSI, respectively. That is, the timing interval K1 between the scheduling unit where the HARQ information is located and the scheduling unit where the downlink service data reception ends and the timing interval K1' between the scheduling unit where the CSI is located and the scheduling unit where the downlink service data reception ends are independently indicated. Similarly, the PRI of the PUCCH resource used by the HARQ information in the scheduling unit in the PUCCH set and the PRI' of the PUCCH resource used by the CSI in the scheduling unit in the PUCCH set are also independently indicated.

For example, the value of K1 is 4, the value of PRI is 1, the value of K1' is 5, and the value of PRI' is 3. The HARQ information corresponding to the PDSCH scheduled by the DCI is fed back in slot n+4, the PUCCH set used by the HARQ information is selected according to the feedback overhead of the HARQ information, and the HARQ information is fed back by using a PUCCH resource with an index of 1 in the selected PUCCH set. The CSI requested by the DCI is fed back in slot n+5, the PUCCH set used for CSI feedback is selected according to the feedback overhead of the CSI, and the CSI is fed back by using a PUCCH resource with an index of 3 in the selected PUCCH set.

In an embodiment, the DCI includes a timing interval K1 between the scheduling unit where the HARQ information is located and a scheduling unit where the downlink service data reception ends, a PRI of the PUCCH resource used by the HARQ information in the scheduling unit in a PUCCH set, and a PRI of the PUCCH resource used by the CSI in the scheduling unit in a PUCCH set. The PUCCH resource set used by the HARQ information in the scheduling unit and the PUCCH resource set used by the CSI in the scheduling unit are determined according to the overhead of the HARQ information and the overhead of the CSI. Meanwhile, the base station configures a timing parameter set for the terminal through an RRC signaling, and the scheduling unit where the CSI is located is obtained by indexing in the timing parameter set with the timing interval K1 between the scheduling unit where the HARQ information is located and the scheduling unit where the downlink service data reception ends.

For example, the value of K1 is 4, the value of PRI is 1, and the RRC signaling configures a set of timing parameter values {1, 2, 4, 8} for CSI feedback. The HARQ information corresponding to the PDSCH scheduled by the DCI is fed back in slot n+4, the PUCCH set used by the HARQ information is selected according to the feedback overhead of the HARQ information, and the HARQ information is fed back by using a PUCCH resource with an index of 1 in the selected PUCCH set. A timing interval between CSI feedback and the PDSCH is indexed according to the fact that K1 is 4, that is, the timing interval is 8. The CSI requested by the DCI is fed back in slot n+8, the PUCCH set used for CSI feedback is selected according to the feedback overhead of the CSI, and the CSI is fed back by using a PUCCH resource with an index of 1 in the selected PUCCH set.

In step S2020, the CSI and the HARQ information sent by the terminal are received, where the PUCCH resource occupied by the CSI and the PUCCH resource occupied by the HARQ information are determined according to the indication information in the DCI.

After the base station sends the DCI to the terminal or configures PUCCH resources used by the CSI and the HARQ information for the terminal in other manners, the terminal may feed back the HARQ information corresponding to downlink service data to the base station on the determined PUCCH resource and feed back the CSI. The base station may obtain the HARQ information and the CSI on the respective determined PUCCH resources. Since the scheduling unit where the CSI fed back by the terminal is located is different from the scheduling unit where the HARQ information fed back by the terminal is located, the base station may receive the CSI and the HARQ information in different scheduling units to avoid interference caused by the receiving of the HARQ information and the CSI.

In addition, in order to ensure the correct receiving of the CSI, the delay between the PUCCH resource used by the CSI in the scheduling unit and a scheduling unit used by the DCI is greater than or equal to the minimum delay required by CSI feedback, and the minimum delay herein is determined according to the system capability.

Figure 3:
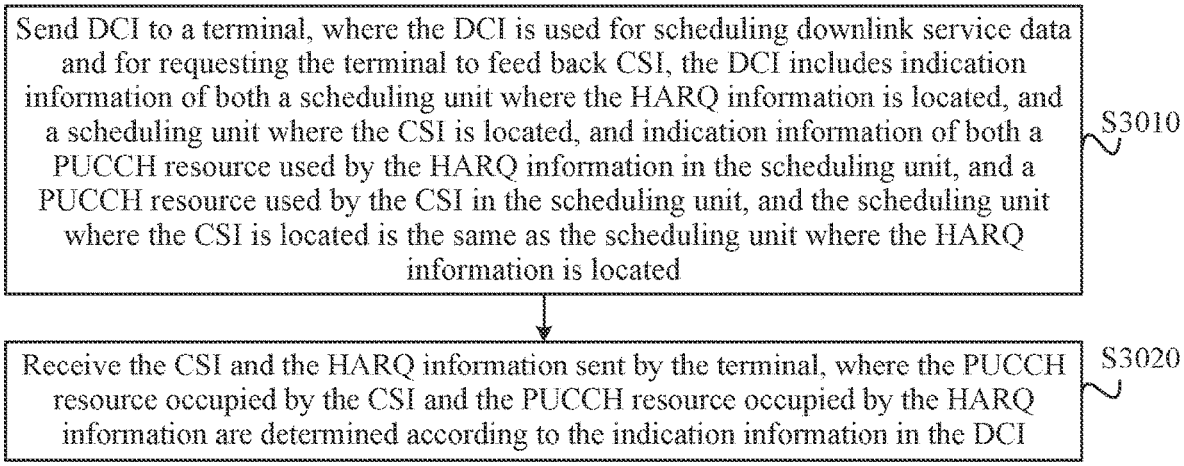
FIG. 3 is a flowchart of another uplink information feedback resource determination method according to an embodiment.

FIG. 3 is a flowchart of another uplink information feedback resource determination method according to an embodiment. As shown in FIG. 3, the method provided by this embodiment includes steps S3010 and S3020.

In step S3010, DCI is sent to a terminal, where the DCI is used for scheduling downlink service data and for requesting the terminal to feed back CSI, the DCI includes indication information of both a scheduling unit where the HARQ information is located, and a scheduling unit where the CSI is located, and indication information of both a PUCCH resource used by the HARQ information in the scheduling unit, and a PUCCH resource used by the CSI in the scheduling unit, and the scheduling unit where the CSI is located is the same as the scheduling unit where the HARQ information is located.

In this embodiment, the DCI sent by the base station to the terminal includes indication information of both a scheduling unit where the HARQ information is located, and a scheduling unit where the CSI is located, and indication information of both a PUCCH resource used by the HARQ information in the scheduling unit, and a PUCCH resource used by the CSI in the scheduling unit, and the scheduling unit where the CSI is located is the same as the scheduling unit where the HARQ information is located.

In an embodiment, the scheduling unit used by the base station to schedule the UE includes multiple PUCCH resources. For example, when the scheduling unit is a slot, in order to avoid the mutual influence between the CSI and the HARQ information fed back by the UE, it is necessary to ensure that the CSI and the HARQ information use different PUCCH resources in the same scheduling unit through a certain mechanism. Therefore, the DCI sent by the base station to the terminal includes indication information of both a scheduling unit where the HARQ information is located, and a scheduling unit where the CSI is located, indication information of an uplink resource used by the HARQ information in the scheduling unit, and indication information of an uplink resource used by the CSI in the scheduling unit.

For example, when the scheduling unit is a slot, the UE completes the receiving of a PDSCH scheduled by the DCI in slot n. The downlink service data is carried on the PDSCH, and the DCI indicates a timing interval K1 between the scheduling unit where the HARQ information is located and the scheduling unit where downlink service data carried on the PDSCH is located after the end of receiving and a PRI used for HARQ information feedback, where the unit of K1 is slot. HARQ information of the PDSCH is determined to be fed back in slot n+K1 through K1. A PUCCH set used for HARQ information feedback is determined according to the feedback overhead of the HARQ information, and an index of a specific PUCCH resource used for HARQ information feedback in the PUCCH set is further determined according to the PRI indicated by the DCI. For CSI feedback requested by the DCI, the CSI and the HARQ information feedback are fed back in the same slot, that is, the CSI is also fed back in slot n+K1. The PUCCH resource used for the CSI feedback may be determined by using any one of the following methods.

In an embodiment, the DCI includes a timing interval K1 between the scheduling unit where the HARQ information is located and the scheduling unit where the downlink service data reception ends, a PRI of the PUCCH resource used by the HARQ information in the scheduling unit in a PUCCH set, and a PRI of the PUCCH resource used by the CSI in the scheduling unit in a PUCCH set. The PUCCH set used by the HARQ information in the scheduling unit is determined according to the overhead of the HARQ information, and the PUCCH set used by the CSI in the scheduling unit is configured according to an RRC signaling. That is, different PUCCH sets are configured for the HARQ information and the CSI. The PRI of the PUCCH resource used by the CSI in the scheduling unit in the PUCCH set and the PRI of the PUCCH resource used by the HARQ information in the scheduling unit in the PUCCH set may be the same and are clearly indicated. Alternatively, the DCI includes an offset value, the PRI of the PUCCH resource used by the HARQ information in the scheduling unit in the PUCCH set is clearly indicated in the DCI, and the PRI of the PUCCH resource used by the CSI in the scheduling unit in the PUCCH set is the PRI of the PUCCH resource used by the HARQ information in the scheduling unit in the PUCCH set plus the offset value. Alternatively, an offset value is configured for the terminal through an RRC signaling, the PRI of the PUCCH resource used by the HARQ information in the scheduling unit in the PUCCH set is clearly indicated in the DCI, and the PRI of the PUCCH resource used by the CSI in the scheduling unit in the PUCCH set is the PRI of the PUCCH resource used by the HARQ information in the scheduling unit in the PUCCH set plus the offset value.

For example, the value of K1 is 4, the value of PRI is 1, and the value of offset value is 1. The HARQ information corresponding to the PDSCH scheduled by the DCI is fed back in slot n+4, the PUCCH set used by the HARQ information is selected according to the feedback overhead of the HARQ information, and the HARQ information is fed back by using a PUCCH resource with an index of 1 in the selected PUCCH set. The RRC signaling configures an independent PUCCH set for CSI feedback, and the CSI requested by the DCI is fed back in slot n+4. The PUCCH resource for CSI feedback may be directly determined by reusing the PRI of the PUCCH resource indicated by the DCI for HARQ information feedback, that is, the CSI is fed back by using a PUCCH resource with an index of 1 in the PUCCH set configured by the RRC signaling for CSI feedback. Alternatively, an offset value is added to the PRI indicated by the DCI for determining the resource for HARQ information feedback, that is, the CSI is fed back by using a PUCCH resource with an index of 2 in the PUCCH set configured by the RRC signaling for CSI feedback, where the offset value may be indicated in the DCI or indicated in the RRC signaling.

In an embodiment, the DCI includes a timing interval K1 between the scheduling unit where the HARQ information is located and the scheduling unit where the downlink service data reception ends, a PRI of the PUCCH resource used by the HARQ information in the scheduling unit in a PUCCH set, and a PRI' of the PUCCH resource used by the CSI in the scheduling unit in a PUCCH set. The PUCCH set used by the HARQ information in the scheduling unit is determined according to the overhead of the HARQ information, and the PUCCH set used by the CSI in the scheduling unit is configured according to an RRC signaling. That is, different PUCCH sets are configured for the HARQ information and the CSI, and the PRI' of the PUCCH resource used by the CSI in the scheduling unit in the PUCCH set is a separately configured value different from the PRI.

For example, the value of K1 is 4, the value of PRI is 1, and the value of PRI' is 3. The HARQ information corresponding to the PDSCH scheduled by the DCI is fed back in slot n+4, the PUCCH set used by the HARQ information is selected according to the feedback overhead of the HARQ information, and the HARQ information is fed back by using a PUCCH resource with an index of 1 in the selected PUCCH set. The RRC signaling configures an independent PUCCH set for CSI feedback, and the CSI requested by the DCI is fed back in slot n+4. The CSI is fed back by using a PUCCH resource with an index of 3 in the PUCCH set configured by the RRC signaling for CSI feedback.

In an embodiment, the DCI includes a timing interval K1 between the scheduling unit where the HARQ information is located and the scheduling unit where the downlink service data reception ends and a PRI of the PUCCH resource used by the HARQ information in the scheduling unit in a PUCCH set. The PUCCH set used by the HARQ information in the scheduling unit is determined according to the overhead of the HARQ information, and the PUCCH set used by the CSI in the scheduling unit is selected in the PUCCH set used by the HARQ information according to the overhead of the CSI. That is, the PUCCH set used for CSI feedback shares part of the PUCCH set configured for HARQ information feedback, and the selected specific PUCCH set is determined according to the feedback overhead of the CSI. For example, four PUCCH sets are configured for the HARQ information, and the CSI shares two of these four PUCCH sets, and a PUCCH set that is used for CSI feedback among the two PUCCH sets is determined according to the feedback overhead of the CSI. The PUCCH resource used for CSI feedback may be selected from the determined PUCCH set in the following manner. The DCI includes an offset value, the PRI of the PUCCH resource used by the CSI in the scheduling unit in the PUCCH set is the PRI of the PUCCH resource used by the HARQ information in the scheduling unit in the PUCCH set plus the offset value. Alternatively, an offset value is configured for the terminal through an RRC signaling, and the PRI of the PUCCH resource used by the CSI in the scheduling unit in the PUCCH set is the PRI of the PUCCH resource used by the HARQ information in the scheduling unit in the PUCCH set plus the offset value. Alternatively, the DCI includes the PRI' of the PUCCH resource used by the CSI in the scheduling unit in the PUCCH set, that is, different PUCCH sets are configured for the HARQ information and the CSI, and PRI' of the PUCCH resource used by the CSI in the scheduling unit in the PUCCH set is a separately configured value different from the PRI.

For example, the value of K1 is 4, the value of PRI is 1, the value of offset value is 1, and the value of PRI' is 3. The HARQ information corresponding to the PDSCH scheduled by the DCI is fed back in slot n+4, the PUCCH set used by the HARQ information is selected according to the feedback overhead of the HARQ information, and the HARQ information is fed back by using a PUCCH resource with an index of 1 in the selected PUCCH set. The CSI feedback shares PUCCH set #1 configured by the RRC signaling for HARQ information feedback, the CIS requested by the DCI is fed back in slot n+4, and the PUCCH set used for CSI feedback may be the PRI indicated by the DCI for determining the resource for HARQ information feedback, that is, the CSI is fed back by using a PUCCH resource with an index of 2 in PUCCH set #1. Alternatively, the PUCCH resource index, PRI', used for CSI feedback is indicated separately in the DCI, that is, the CSI is fed back by using a PUCCH resource with an index of 3 in PUCCH set #1.

In an embodiment, the DCI includes a timing interval K1 between the scheduling unit where the HARQ information is located and the scheduling unit where the downlink service data reception ends, a PRI of the PUCCH resource used by the HARQ information in the scheduling unit in a PUCCH set, and a PRI of the PUCCH resource used by the CSI in the scheduling unit in a PUCCH set. The PUCCH set used by the HARQ information in the scheduling unit and the PUCCH set used by the CSI in the scheduling unit are determined according to the overhead of the HARQ information and the overhead of the CSI. Since the feedback overhead of the HARQ information is different from the feedback overhead of the CSI, the PUCCH set where the HARQ information is located and the PUCCH set where the CSI is located may be distinguished according to the difference between the feedback overhead of the HARQ information and the feedback overhead of the CSI. For example, the feedback overhead of the HARQ information is 1 bit, the feedback overhead of the CSI is 4 bits, and the PUCCH set selected for HARQ information feedback according to the feedback overhead of the HARQ information and the PUCCH set selected for CSI feedback according to the feedback overhead of the CSI do not belong to the same PUCCH set. A PUCCH resource in the PUCCH set used for HARQ information feedback is selected according to the PRI for HARQ information feedback, and a PUCCH resource used for CSI feedback may be determined by reusing the PRI indicated by the DCI for HARQ information feedback. Alternatively, the DCI includes an offset value, and the PRI of the PUCCH resource used by the CSI in the scheduling unit in the PUCCH set is the PRI of the PUCCH resource used by the HARQ information in the scheduling unit in the PUCCH set plus the offset value. Alternatively, an offset value is configured for the terminal through an RRC signaling, and the PRI of the PUCCH resource used by the CSI in the scheduling unit in the PUCCH set is the PRI of the PUCCH resource used by the HARQ information in the scheduling unit in the PUCCH set plus the offset value. Alternatively, the DCI includes the PRI' of the PUCCH resource used by the CSI in the scheduling unit in the PUCCH set, that is, different PUCCH sets are configured for the HARQ information and the CSI, and PRI' of the PUCCH resource used by the CSI in the scheduling unit in the PUCCH set is a separately configured value different from the PRI.

For example, the value of K1 is 4, the value of PRI is 1, the value of offset value is 1, and the value of PRI' is 3. The HARQ information corresponding to the PDSCH scheduled by the DCI is fed back in slot n+4, the PUCCH set used by the HARQ information is selected according to the feedback overhead of the HARQ information, and the HARQ information is fed back by using a PUCCH resource with an index of 1 in the selected PUCCH set. The PUCCH set used for CSI feedback is selected according to the feedback overhead of the CSI, the CSI requested by the DCI is fed back in slot n+4, and the PUCCH resource for CSI feedback may be directly determined by reusing the PRI of the PUCCH resource indicated by the DCI for HARQ information feedback, that is, the CSI is fed back by using a PUCCH resource with an index of 1 in the PUCCH set selected for CSI feedback. Alternatively, an offset value is added to the PRI indicated by the DCI for determining the resource for HARQ information feedback, that is, the CSI is fed back by using a PUCCH resource with an index of 2 in the PUCCH set selected for CSI feedback, where the offset value may be indicated in the DCI or indicated in the RRC signaling. Alternatively, the PUCCH resource index, PRI', used for CSI feedback is indicated separately in the DCI, that is, the CSI is fed back by using a PUCCH resource with an index of 3 in the PUCCH set selected for CSI feedback.

In an embodiment, the DCI includes a timing interval K1 between the scheduling unit where the HARQ information is located and the scheduling unit where the downlink service data reception ends, a PRI of the PUCCH resource used by the HARQ information in the scheduling unit in a PUCCH set, and a PRI of the PUCCH resource used by the CSI in the scheduling unit in a PUCCH set. The PUCCH set used by the HARQ information in the scheduling unit and the PUCCH set used by the CSI in the scheduling unit are determined according to a larger one between the overhead of the HARQ information and the overhead of the CSI. Since the PUCCH set used by the HARQ information in the scheduling unit and the PUCCH set used by the CSI in the scheduling unit are determined according to the larger overhead, the set of the determined PUCCH size is sufficient for both the one with larger feedback overhead and one with smaller feedback overhead to use, that is, the PUCCH set used by the HARQ information in the scheduling unit and the PUCCH set used by the CSI in the scheduling unit are the same, and the HARQ information and the CSI select different PUCCH resources in the same PUCCH set. The PUCCH resource used by the HARQ information in the PUCCH set is determined according to the PRI indicated in the DCI, and the PUCCH resource used by the CSI in the PUCCH set may be determined in one of the following manners. The DCI includes an offset value, and the PRI of the PUCCH resource used by CSI in the scheduling unit in the PUCCH set is the PRI of the PUCCH resource used by the HARQ information in the scheduling unit in the PUCCH set plus the offset value. Alternatively, an offset value is configured for the terminal through an RRC signaling, and the PRI of the PUCCH resource used by the CSI in the scheduling unit in the PUCCH set is the PRI of the PUCCH resource used by the HARQ information in the scheduling unit in the PUCCH set plus the offset value. Alternatively, the PUCCH resource used by the CSI in the scheduling unit is adjacent to and does not overlap the PUCCH resource used by the HARQ information in the scheduling unit.

For example, the value of K1 is 4, the value of PRI is 1, and the value of offset value is 1. The HARQ information corresponding to the PDSCH scheduled by the DCI is fed back in slot n+4, and the CIS requested by the DCI is also fed back in slot n+4. The PUCCH set used by the HARQ information and the PUCCH set used by the CSI are selected according to the larger one between the feedback overhead of the HARQ information and the feedback overhead of the CSI. The HARQ information is fed back by using a PUCCH resource with an index of 1 in the selected PUCCH set, and the PUCCH resource for CSI feedback is the PRI indicated by the DCI for determining the resource for HARQ information feedback plus an offset value, that is, the CSI is fed back by using a PUCCH feedback with an index of 2 in the PUCCH set, where the offset value is indicated by the DCI or by the RRC signaling. Alternatively, in the PUCCH set, the PRI that does not overlap and is adjacent to the PRI of 1 in the time domain is 5, and the CSI is fed back by using a PUCCH resource with an index of 5 in the PUCCH set.

In step S3020, the CSI and the HARQ information sent by the terminal are received, where the PUCCH resource occupied by the CSI and the PUCCH resource occupied by the HARQ information are determined according to the indication information in the DCI.

After the base station sends the DCI to the terminal or configures PUCCH resources used by the CSI and the HARQ information for the terminal in other manners, the terminal may feed back the HARQ information corresponding to downlink service data to the base station on the determined PUCCH resource and feed back the CSI. The base station may obtain the HARQ information and the CSI on the respective determined PUCCH resources. Although the CSI and the HARQ information fed back by the terminal are located in the same scheduling unit, the specific PUCCH resources used by the HARQ information and the CSI are different, so the base station may complete the receiving of the CSI and the HARQ information on different PUCCH resources in the same scheduling unit.

In addition, in order to ensure the correct receiving of the CSI, the delay between the PUCCH resource used by the CSI in the scheduling unit and a scheduling unit used by the DCI is greater than or equal to the minimum delay required by CSI feedback, and the minimum delay herein is determined according to the system capability.

Figure 4:
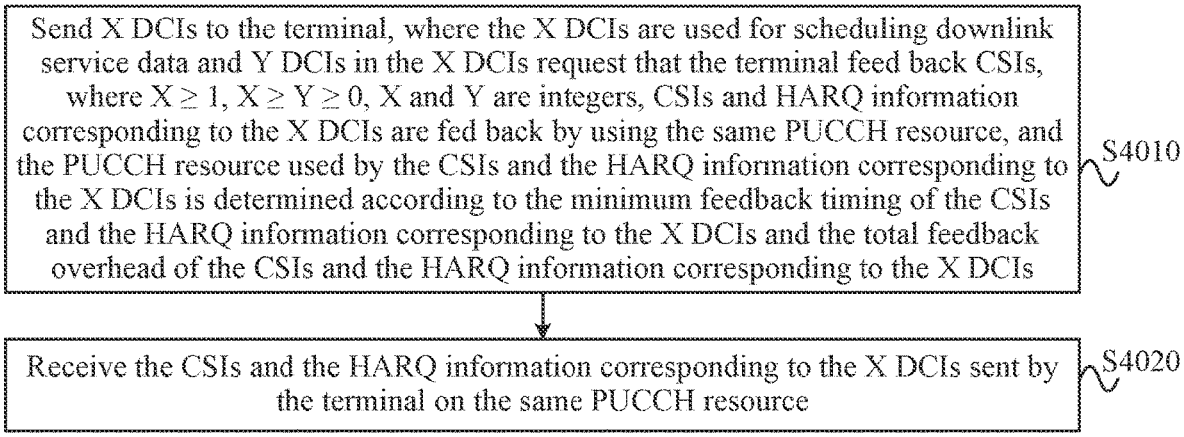
FIG. 4 is a flowchart of another uplink information feedback resource determination method according to an embodiment.

FIG. 4 is a flowchart of another uplink information feedback resource determination method according to an embodiment. As shown in FIG. 4, the method provided by this embodiment includes steps S4010 and S4020.

In step S4010, X DCIs are sent to the terminal, where the X DCIs are used for scheduling downlink service data and Y DCIs in the X DCIs request that the terminal feed back CSIs, where X≥1, X≥Y≥0, X and Y are integers, CSIs and HARQ information corresponding to the X DCIs are fed back by using the same PUCCH resource, and the PUCCH resource used by the CSIs and the HARQ information corresponding to the X DCIs is determined according to the minimum feedback timing of the CSIs and the HARQ information corresponding to the X DCIs and the total feedback overhead of the CSIs and the HARQ information corresponding to the X DCIs.

In this embodiment, a base station sends multiple DCIs to a UE, part of the multiple DCIs requests CSI feedback, and the HARQ information of downlink service data scheduled by the multiple DCIs and the CSI feedback requested by the multiple DCIs are fed back on the same PUCCH resource. However, the multiple DCIs sent by the base station to the UE may be subjected to missed detection by the UE. If some DCIs are subjected to missed detection by the UE, it may lead to an inconsistent understanding of the feedback overhead between the UE and the base station, which affects the selection of PUCCH resources. Therefore, each of the DCIs sent by the base station to the terminal includes indication information of both a scheduling unit where the HARQ information is located, and a scheduling unit where the CSI is located, and indication information of both a PUCCH resource used by the HARQ information in the scheduling unit, and a PUCCH resource used by the CSI in the scheduling unit. The PUCCH resources used by the CISs and the HARQ information corresponding to the X DCIs are determined according to the minimum feedback timing of the CSIs and the HARQ information corresponding to the X DCIs and the total feedback overhead of the CSIs and the HARQ information corresponding to the X DCIs.

For example, when the scheduling unit is a slot, the UE completes the receiving of the PDSCH scheduled by the DCI in slot n, the DCI indicates the timing interval K1 between the HARQ information and the PDSCH and a PRI used for HARQ information feedback, and the CSI and the HARQ information are fed back by using the same PUCCH resource, where when the values of the K1 and the PRI are determined, the DCI needs to determine the K1 and the PRI according to the minimum feedback timing of the HARQ information and the minimum feedback timing of the CSI and satisfy the minimum feedback timing of the both. The resources for the feedback of the CIS and the HARQ information are determined through the specific process described below. HARQ information feedback information of the PDSCH and CSI feedback information requested by the DCI are determined to be fed back in slot n+K1 according to K1, the PUCCH set used for HARQ information feedback and the PUCCH set used for CSI feedback are determined according to the total feedback overhead of the HARQ information and the CSI, and then the HARQ information and the CSI are determined to be fed back by using the PUCCH resource with an index of PRI according to the PRI indicated by the DCI. X DCIs respectively schedule PDSCHs, Y DCIs in the X DCIs request CSI feedback, and HARQ information of the PDSCHs scheduled by the DCIs and CSIs requested by the DCIs are fed back on the same PUCCH resource, where X≥1, X≥Y≥0, and X and Y are integers. In order to avoid inconsistent understanding of feedback overhead between the base station and the UE caused by missed detection of DCIs, any of the following manners may be adopted.

In an embodiment, the X DCIs are used for scheduling downlink service data and all X DCIs request CSI feedback from the terminal. That is, the base station and the UE agree that the X DCIs enable CSI feedback by default, that is, Y=X. The DCI information includes a downlink assignment index (DAI) field, and the UE may decide whether the DCIs are subjected to missed detection through DAI information. When the UE detects that DCI is subjected to missed detection, HARQ information feedback information and CSI feedback information are supplemented for the missed DCI, so as to keep the base station and the UE consistent in an understanding of the feedback overhead of the HARQ information and the CSI. For example, the value of K1 is 4, the value of PRI is 1, the value of X is 3, and then the value of Y is also Y. HARQ information and CSI feed back in slot n+4. The HARQ information and the CIS are fed back in slot n+4. If the feedback overhead of the HARQ information is 1 bit and the feedback overhead of the CSI is 4 bits, the total feedback overhead of the HARQ information and the CSI is 15 bits ((1+4)×3=15). The PUCCH set selected for the feedback of both the HARQ information and the CSI is determined according to the feedback overhead of 15 bits, and the HARQ information and the CSI are fed back by using the PUCCH resource with an index of 1 in the PUCCH set. If the UE receives two DCI scheduling information and decides through DAI information that one DCI is subjected to missed detection, the feedback overhead of 10 bits is increased by 1 bit and 4 bits which are respectively used for HARQ information feedback and CSI feedback, and the PUCCH set used for feedback is determined according to the feedback overhead of 15 bits.

In an embodiment, the X DCIs are used for scheduling downlink service data, if an X-th DCI requests CSI feedback from the terminal, all X DCIs request CSI feedback, and if the X-th DCI does not request CSI feedback from the terminal, all X DCIs do not request CSI feedback. The X DCIs are ordered as DCI-1, DCI-2, . . . , and DCI-X in the order of occurrence in the time domain, and the feedback of CSI is determined according to whether DCI-X requests CSI feedback. If DCI-X requests CSI feedback, and then all X DCIs request CSI feedback, and at this point, Y=X. If DCI-X does not request CSI feedback, then X DCIs do not request CSI feedback, and at this point, Y=0. For example, the value of K1 is 4, the value of PRI is 1, the value of X is 3, and three DCIs are ordered as DCI-1, DCI-2, and DCI-3 in the order of occurrence in the time domain. There are two cases of whether CSI feedback is enabled according to DCI-3. In Case 1, DCI-3 requests CSI feedback, and then all three DCIs request CSI feedback. At this point, Y=X=3, and the HARQ information and the CSI are fed back in slot n+4. If the feedback overhead of the HARQ information is 1 bit and the feedback overhead of the CSI is 4 bits, then the total feedback overhead of the HARQ information and the CSI is 15 bits. According to the feedback overhead of 15 bits, the PUCCH set selected for feedback is determined, and the HARQ information and the CSI are fed back by using the PUCCH resource with an index of 1 in the PUCCH set. If the UE receives two DCI scheduling information where one of DCI-1 and DCI-2 is subjected to missed detection and decides through DAI information that one DCI-1 is subjected to missed detection, the feedback overhead of 10 bits is increased by 1 bit and 4 bits which are respectively used for HARQ information feedback and CSI feedback, and the PUCCH set used for feedback is determined according to the feedback overhead of 15 bits. In Case 2, DCI-3 does not request CSI feedback, and then none of the three DCIs request CSI feedback. At this point, Y=0, the CIS is not fed back, and the HARQ information is fed back in slot n+4. If the feedback overhead of the HARQ information is 1 bit, then the total feedback overhead of the HARQ information is 3 bits. According to the feedback overhead of 3 bits, the PUCCH set selected for feedback is determined, and the HARQ information is fed back by using the PUCCH resource with an index of 1 in the PUCCH set. If the UE receives two DCI scheduling information where one of DCI-1 and DCI-2 is subjected to missed detection and decides through DAI information that one DCI is subjected to missed detection, the feedback overhead of 2 bits is increased by 1 bit which is used for HARQ information feedback, and the PUCCH set used for feedback is determined according to the feedback overhead of 3 bits.

In an embodiment, the X DCIs are used for scheduling downlink service data and one of the X DCIs requests CSI feedback from the terminal. That is, only one DCI in the X DCI requests CSI feedback, and there are the following cases about the DCI that requests CSI feedback In Case 1, the X DCIs are ordered as DCI-1, DCI-2, . . . , and DCI-X in the order of occurrence in the time domain, where DCI-X requests CSI feedback by default, and other DCIs do not request CSI feedback by default, that is, Y=1. For example, the value of K1 is 4, the value of PRI is 1, the value of X is 3, and three DCIs are ordered as DCI-1, DCI-2, and DCI-3 in the order of occurrence in the time domain. DCI-3 requests CSI feedback by default while DCI-1 and DCI-2 do not request CSI feedback by default, and at this point, Y=1. The HARQ information and the CIS are fed back in slot n+4. If the feedback overhead of the HARQ information is 1 bit and the feedback overhead of the CSI is 4 bits, the total feedback overhead of the HARQ information and the CSI is 7 bits. The PUCCH set selected for the feedback of both the HARQ information and the CSI is determined according to the feedback overhead of 7 bits, and the HARQ information and the CSI are fed back by using the PUCCH resource with an index of 1 in the PUCCH set. If the UE receives two DCI scheduling information where one of DCI-1 and DCI-2 is subjected to missed detection and decides through DAI information that one DCI is subjected to missed detection, the feedback overhead of 6 bits is increased by 1 bit which is used for HARQ information feedback, and the PUCCH set used for feedback is determined according to the feedback overhead of 7 bits.

In Case 2, the X DCIs are ordered as DCI-1, DCI-2, . . . , and DCI-X in the order of occurrence in the time domain, and the request of only one DCI in the X DCIs for CSI feedback is valid. If only the request of DCI-i for CSI feedback is detected in the X DCIs, then the CSI is fed back according to the request of DCI-i. If requests of multiple DCIs for CSI feedback are detected, where two of the multiple DCIs are DCI-i and DCI-j respectively and i<j, the CSI is fed back according to the request of DCI-i, and the request of only one DCI for CSI feedback is valid. If no request of DCIs for CSI feedback is detected, the CSI is fed back according to the request of the last DCI, DCI-X, for CSI feedback by default, where i>1 and i and j are integers.

For example, the value of K1 is 4, the value of PRI is 1, the value of X is 3, and three DCIs are ordered as DCI-1, DCI-2, and DCI-3 in the order of occurrence in the time domain. If only the request of DCI-2 for CSI feedback is detected, the CSI is fed back according to the CSI request of the DCI-2. The HARQ information and the CIS are fed back in slot n+4. If the feedback overhead of the HARQ information is 1 bit and the feedback overhead of the CSI is 4 bits, the total feedback overhead of the HARQ information and the CSI is 7 bits. The PUCCH set selected for the feedback of both the HARQ information and the CSI is determined according to the feedback overhead of 7 bits, and the HARQ information and the CSI are fed back by using the PUCCH resource with an index of 1 in the PUCCH set. If the UE receives two DCI scheduling information where DCI-2 is subjected to missed detection and decides through DAI information that one DCI between DCI-1 and DCI-3 is subjected to missed detection, the feedback overhead of 6 bits is increased by 1 bit which is used for HARQ information feedback, and the PUCCH set used for feedback is determined according to the feedback overhead of 7 bits, where the CSI is fed back according to the request of DCI-3 by default. If the UE receives two DCI scheduling information where DCI-1 is subjected to missed detection and decides through DAI information that one DCI before DCI-2 is subjected to missed detection, the feedback overhead of 6 bits is increased by 1 bit which is used for HARQ information feedback, and the PUCCH set used for feedback is determined according to the feedback overhead of 7 bits, where the CSI is fed back according to the request of DCI-2. If the UE receives only one DCI information and decides through DAI information that two DCIs before DCI-3 are subjected to missed detection, the feedback overhead of 5 bits is increased by 2 bits which are used for HARQ information feedback, and the PUCCH set used for feedback is determined according to the feedback overhead of 7 bits, where the CSI is fed back according to the request of DCI-3 by default.

If only the requests of both DCI-1 and DCI-2 for CSI feedback are detected, the CSI is fed back according to the CSI request of the DCI-1. The HARQ information and the CIS are fed back in slot n+4. If the feedback overhead of the HARQ information is 1 bit and the feedback overhead of the CSI is 4 bits, the total feedback overhead of the HARQ information and the CSI is 7 bits. The PUCCH set selected for the feedback of both the HARQ information and the CSI is determined according to the feedback overhead of 7 bits, and the HARQ information and the CSI are fed back by using the PUCCH resource with an index of 1 in the PUCCH set. If the UE receives two DCI scheduling information, detects that DCI-1 requests CSI feedback, and decides through DAI information that one DCI between DCI-1 and DCI-3 is subjected to missed detection, the feedback overhead of 6 bits is increased by 1 bit which is used for HARQ information feedback, and the PUCCH set used for feedback is determined according to the feedback overhead of 7 bits, where the CSI is fed back according to the request of DCI-1. If the UE receives two DCI scheduling information, detects that DCI-2 requests CSI feedback, and decides through DAI information that one DCI before DCI-2 is subjected to missed detection, the feedback overhead of 6 bits is increased by 1 bit which is used for HARQ information feedback, and the PUCCH set used for feedback is determined according to the feedback overhead of 7 bits, where the CSI is fed back according to the request of DCI-2. If the UE receives only one DCI information and decides through DAI information that two DCIs before DCI-3 are subjected to missed detection, the feedback overhead of 5 bits is increased by 2 bits which are used for HARQ information feedback, and the PUCCH set used for feedback is determined according to the feedback overhead of 7 bits, where the CSI is fed back according to the request of DCI-3 by default.

If requests of DCI-2 and DCI-3 for CSI feedback are not detected, the CSI is fed back according to the request of the DCI-3 by default. The HARQ information and the CIS are fed back in slot n+4. If the feedback overhead of the HARQ information is 1 bit and the feedback overhead of the CSI is 4 bits, the total feedback overhead of the HARQ information and the CSI is 7 bits. The PUCCH set selected for the feedback of both the HARQ information and the CSI is determined according to the feedback overhead of 7 bits, and the HARQ information and the CSI are fed back by using the PUCCH resource with an index of 1 in the PUCCH set.

In Case 3, the X DCIs are ordered as DCI-1, DCI-2, . . . , and DCI-X in the order of occurrence in the time domain, and the request of only one DCI in the X DCIs for CSI feedback is valid. If only the request of DCI-i for CSI feedback is detected in the X DCIs, then the CSI is fed back according to the request of DCI-i. If requests of multiple DCIs for CSI feedback are detected, where two of the multiple DCIs are DCI-i and DCI-j respectively and i<j, the CSI is fed back according to the request of DCI-i, and the request of only one DCI for CSI feedback is valid. If no request of DCIs for CSI feedback is detected, the CSI is fed back according to the request of the last DCI, DCI-X, for CSI feedback by default, where i>1 and i and j are integers.

For example, the value of K1 is 4, the value of PRI is 1, the value of X is 3, and three DCIs are ordered as DCI-1, DCI-2, and DCI-3 in the order of occurrence in the time domain. If only the request of DCI-2 for CSI feedback is detected, the CSI is fed back according to the CSI request of the DCI-2. The HARQ information and the CIS are fed back in slot n+4. If the feedback overhead of the HARQ information is 1 bit and the feedback overhead of the CSI is 4 bits, the total feedback overhead of the HARQ information and the CSI is 7 bits. The PUCCH set selected for the feedback of both the HARQ information and the CSI is determined according to the feedback overhead of 7 bits, and the HARQ information and the CSI are fed back by using the PUCCH resource with an index of 1 in the PUCCH set. If the UE receives two DCI scheduling information where DCI-2 is subjected to missed detection and decides through DAI information that one DCI between DCI-1 and DCI-3 is subjected to missed detection, the feedback overhead of 6 bits is increased by 1 bit which is used for HARQ information feedback, and the PUCCH set used for feedback is determined according to the feedback overhead of 7 bits, where the CSI is fed back according to the request of DCI-3 by default. If the UE receives two DCI scheduling information where DCI-1 is subjected to missed detection and decides through DAI information that one DCI before DCI-2 is subjected to missed detection, the feedback overhead of 6 bits is increased by 1 bit which is used for HARQ information, and the PUCCH set used for feedback is determined according to the feedback overhead of 7 bits, where the CSI is fed back according to the request of DCI-2. If the UE receives only one DCI information and decides through DAI information that two DCIs before DCI-3 are subjected to missed detection, the feedback overhead of 5 bits is increased by 2 bits which are used for HARQ information feedback, and the PUCCH set used for feedback is determined according to the feedback overhead of 7 bits, where the CSI is fed back according to the request of DCI-3 by default.

If only the requests of both DCI-1 and DCI-2 for CSI feedback are detected, the CSI is fed back according to the CSI request of the DCI-1. The HARQ information and the CIS are fed back in slot n+4. If the feedback overhead of the HARQ information is 1 bit and the feedback overhead of the CSI is 4 bits, the total feedback overhead of the HARQ information and the CSI is 7 bits. The PUCCH set selected for the feedback of both the HARQ information and the CSI is determined according to the feedback overhead of 7 bits, and the HARQ information and the CSI are fed back by using the PUCCH resource with an index of 1 in the PUCCH set. If the UE receives two DCI scheduling information, detects that DCI-1 requests CSI feedback, and decides through DAI information that one DCI between DCI-1 and DCI-3 is subjected to missed detection, the feedback overhead of 6 bits is increased by 1 bit which is used for HARQ information feedback, and the PUCCH set used for feedback is determined according to the feedback overhead of 7 bits, where the CSI is fed back according to the request of DCI-1. If the UE receives two DCI scheduling information, detects that DCI-2 requests CSI feedback, and decides through DAI information that one DCI before DCI-2 is subjected to missed detection, the feedback overhead of 6 bits is increased by 1 bit which is used for HARQ information feedback, and the PUCCH set used for feedback is determined according to the feedback overhead of 7 bits, where the CSI is fed back according to the request of DCI-2. If the UE receives only one DCI information and decides through DAI information that two DCIs before DCI-3 are subjected to missed detection, the feedback overhead of 5 bits is increased by 2 bits which are used for HARQ information feedback, and the PUCCH set used for feedback is determined according to the feedback overhead of 7 bits, where the CSI is fed back according to the request of DCI-3 by default.

If requests of DCI-2 and DCI-3 for CSI feedback are not detected, the CSI is fed back according to the request of the DCI-3 by default. The HARQ information and the CIS are fed back in slot n+4. If the feedback overhead of the HARQ information is 1 bit and the feedback overhead of the CSI is 4 bits, the total feedback overhead of the HARQ information and the CSI is 7 bits. The PUCCH set selected for the feedback of both the HARQ information and the CSI is determined according to the feedback overhead of 7 bits, and the HARQ information and the CSI are fed back by using the PUCCH resource with an index of 1 in the PUCCH set.

In an embodiment, the X DCIs are used for scheduling downlink service data and Y DCIs in the X DCIs request CSI feedback from the terminal, the X DCIs include CSI feedback statistical information, and the CSI feedback statistical information is used for enabling the terminal to determine the number of DCIs requesting CSI feedback in DCIs sent by the base station. Statistical information of CSI feedback requests is added in DCI information, which is similar to the DAI. The UE may identify whether there is any DCI requesting CSI feedback is lost through the statistical information. In a case where DCI requesting CSI feedback is lost, corresponding CSI feedback is added to keep the UE and the base station consistent in the understanding of the feedback overhead of the HARQ information and the CSI.

For example, the value of K1 is 4, the value of PRI is 1, the value of X is 3, and three DCIs are ordered as DCI-1, DCI-2, and DCI-3 in the order of occurrence in the time domain, where DC-1 and DCI-3 request CSI feedback. Similar to the DAI of the statistics of DCIs to assist in deciding whether DCIs are subjected to missed detection, information of the statistics of CSI feedback requests to assist in deciding whether DCIs requesting CSI feedback are subjected to missed detection is called DAI-CSI. If the UE successfully detects DCI-1, DCI-2, and DCI-3 and detects that DCI-1 and DCI-3 request CSI feedback, the CSI is fed back according to the CSI requests of DCI-1 and DCI-3 respectively. The HARQ information and the CIS are fed back in slot n+4. If the feedback overhead of the HARQ information is 1 bit and the feedback overhead of the CSI is 4 bits, the total feedback overhead of the HARQ information and the CSI is 11 bits. The PUCCH set selected for the feedback of both the HARQ information and the CSI is determined according to the feedback overhead of 11 bits, and the HARQ information and the CSI are fed back by using the PUCCH resource with an index of 1 in the PUCCH set.

If the UE receives two DCI scheduling information where DCI-2 is subjected to missed detection, decides through DAI information that one DCI between DCI-1 and DCI-3 is subjected to missed detection, and decides through DAI-CSI that the DCI-2 subjected to missed detection does not request CSI feedback, then the feedback overhead of 10 bits is increased by 1 bit which is used for HARQ information feedback, and the PUCCH set used for feedback is determined according to the feedback overhead of 11 bits, where the CSI is fed back according to the requests of DCI-1 and DCI-3 respectively. If the UE receives two DCI scheduling information where DCI-1 is subjected to missed detection, decides through DAI information that one DCI before DCI-2 is subjected to missed detection, and decides through DAI-CSI that the DCI-1 subjected to missed detection requests CSI feedback, then the feedback overhead of 6 bits is increased by 4 bits and 1 bit which are used for CSI feedback and HARQ information feedback respectively, and the PUCCH set used for feedback is determined according to the feedback overhead of 11 bits, where the CSI is fed back according to the requests of DCI-1 and DCI-3 respectively. If the UE receives one DCI scheduling information, decides through DAI information that two DCIs before DCI-3 are subjected to missed detection, and decides through DAI-CSI that the DCI-1 subjected to missed detection requests CSI feedback, then the feedback overhead of 5 bits is increased by 4 bits and 2 bits which are used for CSI feedback and HARQ information feedback respectively, and the PUCCH set used for feedback is determined according to the feedback overhead of 11 bits, where the CSI is fed back according to the requests of DCI-1 and DCI-3 respectively.

In an embodiment, the UE may also determine whether to trigger CSI feedback according to the decoding result of the received PDSCH. If the UE decodes the PDSCH correctly, the HARQ information is fed back as an ACK, and if the UE decodes the PDSCH incorrectly, CSI information is fed back, where the overhead of ACK information is the same as the overhead of the CSI information. The UE may perform statistics on whether DCIs are subjected to missed detection according to the DAI, and if DCI is subjected to missed detection, CSI is fed back for the DCI, so as to keep the UE and the base station consistent in the understanding of the feedback overhead of the HARQ information and the CSI. Specifically, the value of K1 is 4, the value of PRI is 1, the value of X is 3, and three DCIs are ordered as DCI-1, DCI-2, and DCI-3 in the order of occurrence in the time domain. It is assumed that the overhead of the ACK fed back when decoding is correct and the overhead of the NACK fed back when decoding is incorrect both are 3 bits. If the UE successfully detects DCI-1, DCI-2 and DCI-3 and the PDSCHs scheduled by the three DCIs are decoded correctly, the ACK information is fed back in slot n+4. The total feedback overhead is 9 bits, the PUCCH set selected for feedback is determined according to the feedback overhead of 9 bits, and the ACK information is fed back by using the PUCCH resource with an index of 1 in the PUCCH set. If the UE successfully detects DCI-1, DCI-2 and DCI-3 and only the PDSCH scheduled by DCI-2 is decoded incorrectly, the ACK information and the CSI information are fed back in slot n+4, the ACK information of 3 bits is fed back for DCI-1 and DCI-3 respectively, and the CSI information of 3 bits is fed back for DCI-2. The total feedback overhead is 9 bits, and the PUCCH set selected for feedback is determined according to the feedback overhead of 9 bits. If the UE successfully detects DCI-1 and DCI-3, the PDSCHs scheduled by the two DCIs are decoded incorrectly, and the UE decides through DAI information that one DCI, DCI-2, between DCI-1 and DCI-3 is subjected to missed detection, the ACK information and the CSI information are fed back in slot n+4, the ACK information of 3 bits is fed back for DCI-1 and DCI-3 respectively, and the CSI information of 3 bits is fed back for DCI-2. The total feedback overhead is 9 bits, and the PUCCH set selected for feedback is determined according to the feedback overhead of 9 bits. In step S4020, the CSIs and the HARQ information corresponding to the X DCIs sent by the terminal are received on the same PUCCH resource.

Since the base station and the UE indicate or agree on the feedback overhead of the CSIs and the HARQ information corresponding to the X DCIs in different manners, the base station may obtain on the same one resource the PUCCH sets used by the UE for feeding back the CSIs and the HARQ information based on the determined feedback overhead, and further determine the PUCCH resources used. In this way, the UE and the base station can be kept consistent in the understanding of the feedback overhead of the HARQ information and the CSI.

Figure 5:
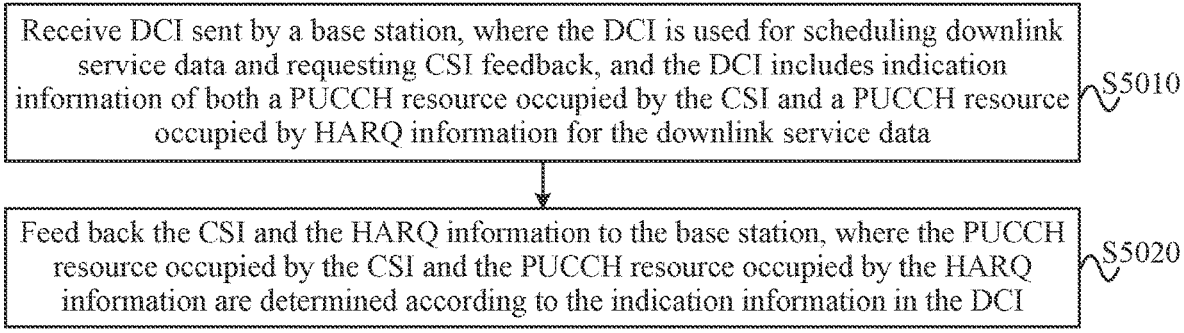
FIG. 5 is a flowchart of another uplink information feedback resource determination method according to an embodiment.

FIG. 5 is a flowchart of another uplink information feedback resource determination method according to an embodiment. As shown in FIG. 5, the method provided by this embodiment includes steps S5010 and S5020.

In step S5010, DCI sent by a base station is received, where the DCI is used for scheduling downlink service data and requesting CSI feedback, and the DCI includes indication information of both a PUCCH resource occupied by the CSI and a PUCCH resource occupied by HARQ information for the downlink service data.

In step S5020, the CSI and the HARQ information are fed back to the base station, where the PUCCH resource occupied by the CSI and the PUCCH resource occupied by the HARQ information are determined according to the indication information in the DCI.

The uplink information feedback resource determination method provided by this embodiment is applied to a user device in a wireless communication system, which is simply referred to as the UE. The UE determines resources used for transmission and various measurement or transmission information to be executed according to various configuration information sent by the base station. The uplink information feedback resource determination method provided by this embodiment is applied to the UE side of the uplink information feedback resource determination method of the embodiment shown in FIG. 1. The implementation principle and technical effect of the uplink information feedback resource determination method provided by this embodiment are similar to those of the method of the embodiment shown in FIG. 1, and details are not repeated here.

Figure 6:
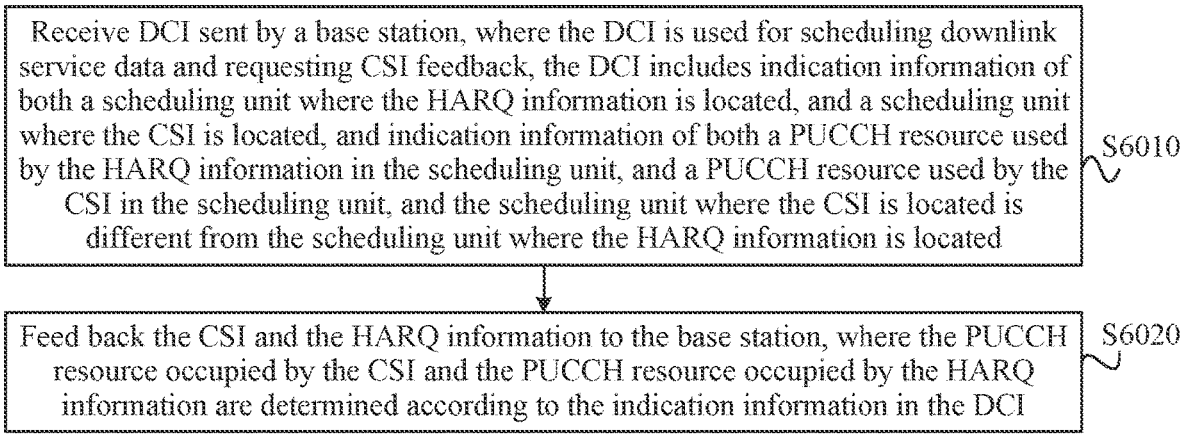
FIG. 6 is a flowchart of another uplink information feedback resource determination method according to an embodiment.

FIG. 6 is a flowchart of another uplink information feedback resource determination method according to an embodiment. As shown in FIG. 6, the method provided by this embodiment includes steps S6010 and S6020.

In step S6010, DCI sent by a base station is received, where the DCI is used for scheduling downlink service data and requesting CSI feedback, the DCI includes indication information of both a scheduling unit where the HARQ information is located, and a scheduling unit where the CSI is located, and indication information of both a PUCCH resource used by the HARQ information in the scheduling unit, and a PUCCH resource used by the CSI in the scheduling unit, and the scheduling unit where the CSI is located is different from the scheduling unit where the HARQ information is located.

In step S6020, the CSI and the HARQ information are fed back to the base station, where the PUCCH resource occupied by the CSI and the PUCCH resource occupied by the HARQ information are determined according to the indication information in the DCI.

The uplink information feedback resource determination method provided by this embodiment is applied to the UE side of the uplink information feedback resource determination method of the embodiment shown in FIG. 2. The implementation principle and technical effect of the uplink information feedback resource determination method provided by this embodiment are similar to those of the method of the embodiment shown in FIG. 2, and details are not repeated here.

FIG. 7 is a flowchart of another uplink information feedback resource determination method according to an embodiment. As shown in FIG. 7, the method provided by this embodiment includes steps S7010 and S7020.

In step S7010, DCI sent by a base station is received, where the DCI is used for scheduling downlink service data and requesting CSI feedback, the DCI includes indication information of both a scheduling unit where the HARQ information is located, and a scheduling unit where the CSI is located, and indication information of both a PUCCH resource used by the HARQ information in the scheduling unit, and a PUCCH resource used by the CSI in the scheduling unit, and the scheduling unit where the CSI is located is the same as the scheduling unit where the HARQ information is located.

In step S7020, the CSI and the HARQ information are fed back to the base station, where the PUCCH resource occupied by the CSI and the PUCCH resource occupied by the HARQ information are determined according to the indication information in the DCI.

The uplink information feedback resource determination method provided by this embodiment is applied to the UE side of the uplink information feedback resource determination method of the embodiment shown in FIG. 3. The implementation principle and technical effect of the uplink information feedback resource determination method provided by this embodiment are similar to those of the method of the embodiment shown in FIG. 3, and details are not repeated here.

FIG. 8 is a flowchart of another uplink information feedback resource determination method according to an embodiment. As shown in FIG. 8, the method provided by this embodiment includes steps S8010 and S8020.

In step S8010, X DCIs sent by a terminal are received, where the X DCIs are used for scheduling downlink service data and Y DCIs in the X DCIs request that the terminal feed back CSIs, where X≥1, X≥Y≥0, X and Y are integers, CSIs and HARQ information corresponding to the X DCIs are fed back by using the same PUCCH resource, and the PUCCH resource used by the CSIs and the HARQ information corresponding to the X DCIs is determined according to the minimum feedback timing of the CSIs and the HARQ information corresponding to the X DCIs and the total feedback overhead of the CSIs and the HARQ information corresponding to the X DCIs.

In step S8020, the CSIs and the HARQ information corresponding to the X DCIs are sent to the base station on the same PUCCH resource.

The uplink information feedback resource determination method provided by this embodiment is applied to the UE side of the uplink information feedback resource determination method of the embodiment shown in FIG. 4. The implementation principle and technical effect of the uplink information feedback resource determination method provided by this embodiment are similar to those of the method of the embodiment shown in FIG. 4, and details are not repeated here.

In the case of channel reciprocity, the base station may obtain downlink channel state information based on an uplink reference signal sent by the UE. However, in most cases, the base station may only obtain spatial information (for example, precoding information (PMI)) from an SRS on the basis of channel reciprocity. Since interference experienced by the UE in the downlink is different from interference experienced by the base station in the uplink, channel quality information (CQI) is also different in the downlink and the uplink, so CQI feedback from the UE is still required in this case. Therefore, it is necessary to simultaneously trigger an SRS and a CQI to obtain spatial information and the CQI. At present, the base stations need to trigger a CQI and an SRS by using different domains of uplink control information. If an SRS and an aperiodic CSI are simultaneously triggered in most scenarios, the use of different domains to trigger the aperiodic CSI and the SRS will cause unnecessary overhead. In addition, the spatial relationship between the SRS and a CSI reference signal (CSI-RS) is not clear. At present, only uplink control information may carry an SRS trigger domain, but there may be no uplink control information for the acquisition of a downlink CSI by using an SRS.

Therefore, the embodiments of the present application also provide a reference signal request indication method which includes steps described below. An uplink DCI or a downlink DCI is sent to a terminal, where the uplink DCI or the downlink DCI is used for indicating an SRS request and a CSI request, and the SRS request and the CSI request are requested according to the same request state or two different request states. In an embodiment, the uplink DCI or the downlink DCI shares the same request state pool, and the request state pool is configured through an RRC signaling or by a media access control-control element (MAC-CE).

In order to reduce DCI overhead, the SRS request and the CSI request share a bit field, that is, the SRS request and the CSI request are indicated through joint encoding, the SRS and the CSI are aperiodic or semi-static. The spatial information of the aperiodic SRS is related to the spatial information of the aperiodic CSI-RS, that is, the aperiodic SRS is correlated in terms of spatial information with the report configuration of the aperiodic CSI-RS that is in the same trigger state as the aperiodic SRS. The SRS and the CSI-RS have a transmission offset value K1, where K1 is configured according to a corresponding request state or according to a corresponding CSI-RS. If K1 is configured according to a corresponding request state, the transmission offset value K1 configured in the configuration of the corresponding CSI-RS is invalid, the terminal transmits the SRS in slot n, and then the corresponding CSI-RS is transmitted in slot n+K1. For example, the spatial relation information of the SRS corresponds to the spatial quasi co-location (QCL) of the aperiodic CSI-RS, that is, the UE may obtain precoding matrix indicator (PMI) information by using the SRS. For example, if the SRS request field is 2 bits, different values correspond to different indication meanings.

| Value | Indication meaning |
|---|---|
| 00 | Not trigger SRS |
| 01 | SRS resource set 1 |
| 02 | SRS resource set 2 |
| 03 | SRS resource set 3 |

If the SRS request and the CSI request share a bit field, different values correspond to different indication meanings.

| Value | Indication meaning |
|---|---|
| 00 | Not trigger SRS and CSI |
| 01 | SRS resource set 1 and CSI configuration 1 |
| 02 | SRS resource set 2 and CSI configuration 2 |
| 03 | SRS resource set 3 and CSI configuration 3 |

In an embodiment, the SRS request and the CSI request may be simultaneously supported in the uplink control information and the downlink control information, or the SRS request and the CSI request may also be simultaneously indicated in the current DCI format 0-1 or the newly introduced DCI. The candidate states of the SRS request and the CSI request in the two DCI formats share the same request state pool configured by the higher layer, where the high layer may perform configuration through an RRC signaling or a MAC-CE. For example, X1 request states in the uplink control information format and X2 request states in the downlink control information all come from Y request states configured through RRC signaling. The method of sharing a request state indication may be implemented in one of the following manners. In Manner 1, a single MAC-CE command is used for activating X1 request states and X2 request states of two DCIs respectively, where the X1 request states may be a fixed subset of the X2 request states. In Manner 2, separate MAC-CE commands are used for activating indications, for example, the MAC-CE1 command is used for activating X1 request states in one DCI, and the MAC-CE2 command is used for activating X2 request states in another DCI.

The embodiments of the present application further provide a reference signal request indication method which includes steps described below. An uplink DCI or a downlink DCI sent by a base station is received, where the uplink DCI or the downlink DCI is used for indicating an SRS request and a CSI request, and the SRS request and the CSI request share a bit field. An SRS and CSI corresponding to a state of the bit field shared by the SRS request and the CSI request are sent to the base station. In an embodiment, the uplink DCI or the downlink DCI shares the same request state pool, and the request state pool is configured through an RRC signaling or by a MAC-CE.

The embodiments of the present application further provide Embodiment one to Embodiment five described below.

Embodiment One

For the current time-domain resource allocation, candidate allocation results are configured through a higher-layer RRC signaling, and one of the RRC-configured candidate allocation results is dynamically indicated through DCI, so as to determine a time-domain resource of the current traffic channel. For the time-domain resource allocation of the PDSCH, RRC-configured parameters include: a slot offset k0, a start and length indicator value (SLIV) or a starting point S and a length L independently indicated, and a PDSCH mapping type. For the time-domain resource allocation of the physical uplink shared channel (PUSCH), RRC-configured parameters include: a slot offset k2, a SLIV or a starting point S and a length L independently indicated, and a PUSCH mapping type. For the time-domain resource allocation of ultra-reliable low-latency communications (URLLC), given that the time-domain resources usually allocated are short, overhead controlled and allocation flexibility are required, and the URLLC usually supports multiple physical downlink control channel (PDCCH) transmission opportunities in a slot, one manner is to change the reference starting point of the SLIV in the PDSCH time-domain resource allocation from the slot boundary to the starting or ending symbol where the PDCCH is located, so as to save unnecessary RRC configuration and DCI overhead. For example, in FIG. 9 that is a schematic diagram of time-domain resource occupancy, at present, the RRC needs to configure 7 rows for time-domain resource occupancy in 7 slots such as {S=0, L=2}, {S=2, L=2}, {S=4, L=2}, {S=6, L=2}, {S=8, L=2}, {S=10, L=2}, and {S=12, L=2}. If the timing starting point is determined according to the starting symbol of the PDCCH, the RRC only needs to configure 1 row for {S=0, L=2}. At this point, if there is no possibility of other time-domain resource allocation, the DCI overhead is reduced from 3 bits to 0 bit. The scheduling limit of the above operation is that the PDSCH and the PDCCH may always start simultaneously by default. However, when the PDSCH is allowed to start earlier than the PDCCH or the interval between the start of the PDSCH and the end of the PDCCH is greater than zero, the above manner is not applicable and needs to be reconsidered.

Figure 10:
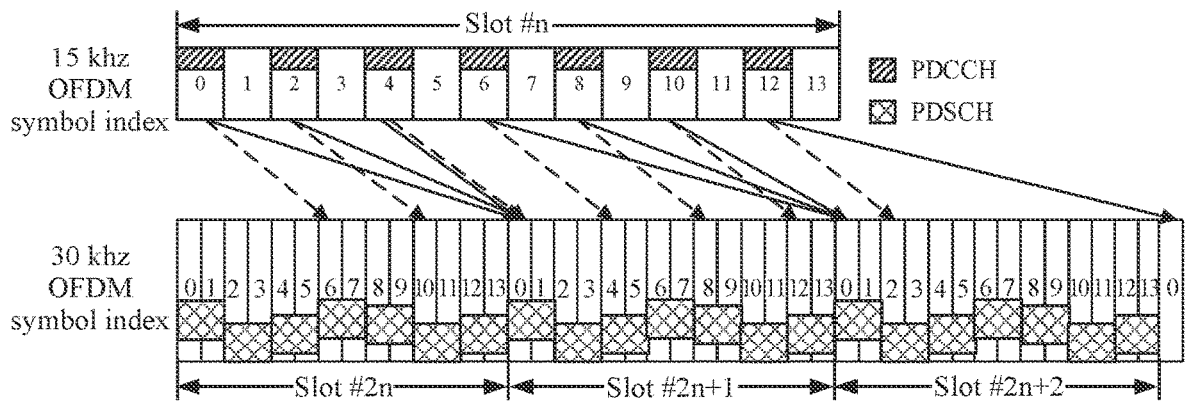
FIG. 10 is a schematic diagram of time-domain resource occupancy (delta=2)
Figure 11:
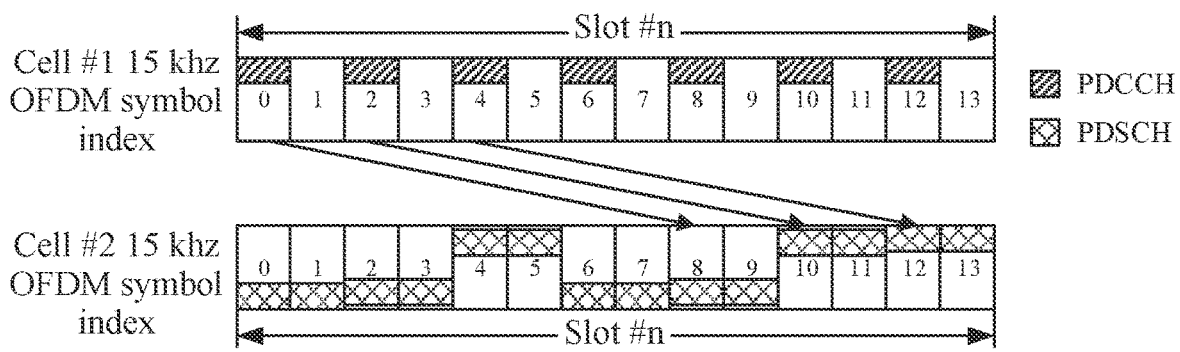
FIG. 11 is a schematic diagram of time-domain resource occupancy (threshold=7 OFDM symbols)

For cross-carrier scheduling scenarios, especially when the subcarrier space (SCS) of the main modulation carrier is greater than the SCS of the modulated carrier, the minimum interval delta between the starting symbol of the PDSCH and the ending symbol of the PDCCH is greater than 0. There are two possible principles for determining the minimum interval delta. In Principle 1, delta is determined according to the number of symbols of the main modulation carrier and is aligned to the slot boundary of the next modulated carrier, for example, delta=2 when the main modulation carrier SCS=15 KHz. In Principle 2, delta is determined according to the number of symbols of the main modulation carrier, for example, delta=2 when the main modulation carrier SCS=15 KHz. When Principle 1 is adopted, delta is aligned to the slot boundary, and at this point, the SLIV is still based on the slot boundary. When Principle 2 is adopted, this embodiment discloses a method of using the starting symbol of a first available PDSCH as the reference starting point of the SLIV. The method is more generally described as a method of using the starting symbol of a first available traffic channel as the reference starting point of the SLIV, where the traffic channel may be a physical downlink traffic channel or a physical uplink traffic channel, that is, a PDSCH or a PUSCH. The SLIV overhead required by the starting symbol of the PDCCH is greater than the SLIV overhead of the starting symbol of the first available PDSCH, and thus when the starting symbol of the first available PDSCH is used as the reference starting point for calculating the SLIV, the overhead becomes smaller. For example, FIG. 10 which is a schematic diagram of time-domain resource occupancy (delta=2), where the solid lines are the minimum interval based on Principle 1, and the dotted lines are the minimum interval based on Principle 2. When Principle 1 is adopted, the reference starting point of the SLIV based on the starting symbol of the PDCCH and the reference starting point of the SLIV based on the slot boundary in the related art cause the ambiguity about the reference starting point of the SLIV, that is, it is necessary to determine one of the two types of reference starting points of the SLIV as the reference starting point of the SLIV through a preset rule (such as selecting one by default) or the notification of the base station. Therefore, in order to avoid the ambiguity about the reference starting point of the SLIV, it is more reasonable and effective to use the starting symbol of the first available PDSCH as the reference starting point of the SLIV according to this embodiment. When Principle 2 is adopted and the starting symbol of the PDCCH is used as the reference starting point of the SLIV, S={6, . . . , 9}, L={1, . . . 4}, and S+L={6, . . . 9} are valid, and during the SLIV calculation, if (L−1)≤5, then SLIV=10·(L−1)+S, else SLIV=10·(10−L+1)+(10−1−S). When the starting symbol of the first available PDSCH is used as the reference starting point of the SLIV, S={0, . . . , 3}, L={1, . . . , 4}, and S+L={1, . . . , 4} are valid, and during the SLIV calculation, if (L−1)≤2, then SLIV=4·(L−1)+S, else SLIV=4·(L−1)+S. As can be seen, when the starting symbol of the first available PDSCH is used as the reference starting point of the SLIV, the SLIV overhead becomes smaller, and the ambiguity about the reference starting point when there may be multiple reference starting points is avoided. In another example, there is a cross-carrier scheduling scenario. As shown in FIG. 11, FIG. 11 is a schematic diagram of time-domain resource occupancy (threshold=7 orthogonal frequency division multiplexing (OFDM) symbols). When the minimum interval between the PDCCH and the PDSCH is a beam switching threshold (for example, time duration for QCL), it is assumed that threshold=7 OFDM symbols, similarly, it is necessary to use the starting symbol of the first available PDSCH as the reference starting point of the SLIV, so as to avoid the problem of excessive overhead caused by the reference starting point of the SLIV based on the slot boundary and the ambiguity about the reference starting point when there may be multiple reference starting points.

Embodiment Two

For the current time-domain resource allocation, candidate allocation results are configured through a higher-layer RRC signaling, and one of the RRC-configured candidate allocation results is dynamically indicated through DCI, so as to determine a time-domain resource of the current traffic channel. For the time-domain resource allocation of the PDSCH, RRC-configured parameters include: a slot offset k0, a SLIV or a starting point S and a length L independently indicated, and a PDSCH mapping type. For the time-domain resource allocation of the PUSCH, RRC-configured parameters include: a slot offset k2, a SLIV or a starting point S and a length L independently indicated, and a PUSCH mapping type. For the time-domain resource allocation of URLLC, given that the time-domain resources usually allocated are short, overhead controlled and allocation flexibility are required, and the URLLC usually supports multiple PDCCH transmission opportunities in a slot, one manner is to change the reference starting point of the SLIV in the PDSCH time-domain resource allocation from the slot boundary to the starting or ending symbol where the PDCCH is located, so as to save unnecessary RRC configuration and DCI overhead. For example, in FIG. 9, the RRC needs to configure 7 rows for time-domain resource occupancy in 7 slots such as {S=0, L=2}, {S=2, L=2}, {S=4, L=2}, {S=6, L=2}, {S=8, L=2}, {S=10, L=2}, and {S=12, L=2}. If the timing starting point is determined according to the starting symbol of the PDCCH, the RRC only needs to configure 1 row for {S=0, L=2}. At this point, if there is no possibility of other time-domain resource allocation, the DCI overhead is reduced from 3 bits to 0 bit. The scheduling limit of the above operation is that the PDSCH and the PDCCH may always start simultaneously by default. However, when the PDSCH is allowed to start earlier than the PDCCH or the interval between the start of the PDSCH and the end of the PDCCH is greater than zero, the above manner is not applicable and needs to be reconsidered.

When the starting symbol of the PDSCH is allowed to be earlier than the starting or ending symbol of the PDCCH, it is obviously unreasonable to use the starting symbol of the PDSCH as the reference starting point of the SLIV. This embodiment discloses a method of using the starting symbol of a first available traffic channel as the reference starting point of the SLIV, where the traffic channel may be a physical downlink traffic channel or a physical uplink traffic channel, that is, a PDSCH or a PUSCH. For example, in FIG. 9, when the PDSCH is allowed to be scheduled up to 2 symbols earlier than the PDCCH, that is, the maximum number X of symbols earlier than the starting symbol of the PDCCH is 2, the starting symbol of the first available PDSCH is used as the reference starting point of the SLIV, and at this point, S={0, . . . , 3}, L={1, . . . , 4}, and S+L={1, . . . , 4}, which can not only solve the problem that PDSCH transmission cannot be implemented earlier than the starting symbol of the PDCCH based on the starting symbol of the PDCCH, but also avoid the problem of excessive overhead caused by the reference starting point of the SLIV based on the slot boundary and the ambiguity about the reference starting point when there may be multiple reference starting points.

Embodiment Three

For the current time-domain resource allocation, candidate allocation results are configured through a higher-layer RRC signaling, and one of the RRC-configured candidate allocation results is dynamically indicated through the DCI, so as to determine a time-domain resource of the current traffic channel. For the time-domain resource allocation of the PDSCH, RRC-configured parameters include: a slot offset k0, a SLIV or a starting point S and a length L independently indicated, and a PDSCH mapping type. For the time-domain resource allocation of the PUSCH, RRC-configured parameters include: a slot offset k2, a SLIV or a starting point S and a length L independently indicated, and a PUSCH mapping type. For the time-domain resource allocation of URLLC, given that the time-domain resources usually allocated are short, overhead controlled and allocation flexibility are required, and the URLLC usually supports multiple PDCCH transmission opportunities in a slot, one manner is to change the reference starting point of the SLIV in the PDSCH time-domain resource allocation from the slot boundary to the starting or ending symbol where the PDCCH is located, so as to save unnecessary RRC configuration and DCI overhead. For example, in FIG. 9, the RRC needs to configure 7 rows for time-domain resource occupancy in 7 slots such as {S=0, L=2}, {S=2, L=2}, {S=4, L=2}, {S=6, L=2}, {S=8, L=2}, {S=10, L=2}, and {S=12, L=2}. If the timing starting point is determined according to the starting symbol the PDCCH, the RRC only needs to configure 1 row for {S=0, L=2}, and at this point, if there is no possibility of other time-domain resource allocation, the DCI overhead is reduced from 3 bits to 0 bit. The scheduling limit of the above operation is that the PDSCH and the PDCCH may always start simultaneously by default. However, when the PDSCH is allowed to start earlier than the PDCCH or the interval between the start of the PDSCH and the end of the PDCCH is greater than zero, the above manner is not applicable and needs to be reconsidered.

Figure 12:
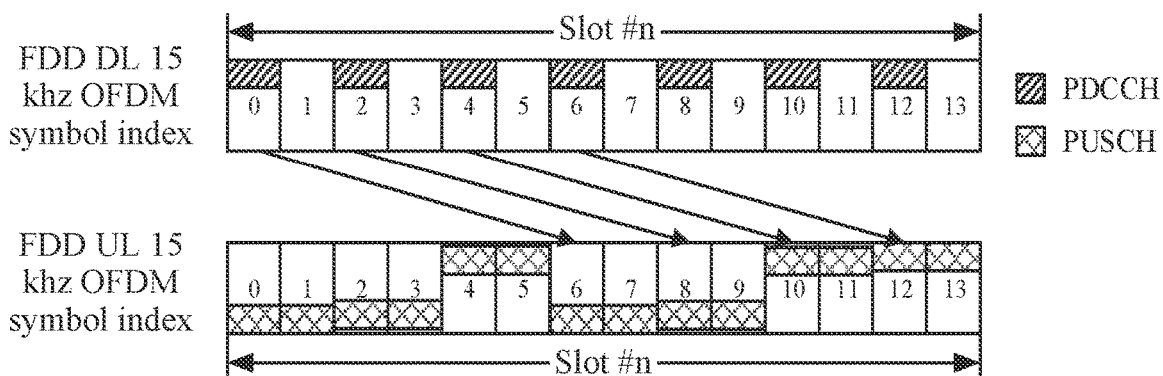
FIG. 12 is a schematic diagram of FDD PUSCH time-domain resource occupancy (N2=5)
Figure 13:
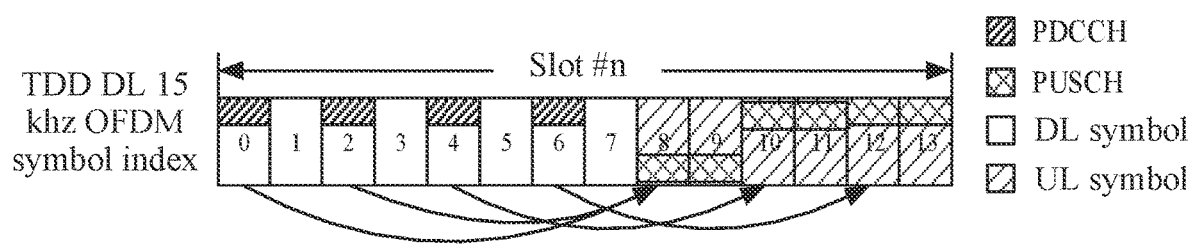
FIG. 13 is a schematic diagram of TDD PUSCH time-domain resource occupancy (N2=5)

For the time-domain resource allocation of the PUSCH, it is also unreasonable to use the starting or ending symbol of the PDCCH as the reference starting point of the SLIV. This embodiment discloses a method of using the starting symbol of a first available PUSCH as the reference starting point of the SLIV. The method is more generally described as a method of using the starting symbol of a first available traffic channel as the reference starting point of the SLIV, where the traffic channel may be a physical downlink traffic channel or a physical uplink traffic channel, that is, a PDSCH or a PUSCH. The starting symbol of the first available PUSCH is separated from the ending symbol of the PDCCH by at least N2 symbols (that is, the minimum preparation time of the PUSCH is N2 OFDM symbols). If the first symbol after the interval of N2 symbols is a downlink symbol, the downlink symbol needs to be skipped to find the first non-downlink symbol available for PDCCH and PUSCH transmission. As shown in FIG. 12, FIG. 12 is a schematic diagram of FDD PUSCH time-domain resource occupancy (N2=5). In the case of frequency division duplex (FDD) and N2=5, if the starting symbol of the PDCCH is used as the reference starting point of the SLIV, then S={6, 7}, L={1, 2}, and S+L={6, 7}. The reference starting point of the SLIV disclosed in this embodiment is the starting symbol of the first available PUSCH, and at this point, S={0, 1}, L={1, 2}, and S+L={1, 2}, which can avoid the problem of excessive overhead caused by the reference starting point of the SLIV based on the slot boundary or the starting/ending symbol of the PDCCH and the ambiguity about the reference starting point when there may be multiple reference starting points. As shown in FIG. 13, FIG. 13 is a schematic diagram of TDD PUSCH time-domain resource occupancy (N2=5). In the case of time division duplex (TDD) and N2=5, if the starting symbol of the PDCCH is used as the reference starting point of the SLIV, the SLIV is not uniform, and there are two possibilities: one is S={8, 9}, L={1, 2}, and S+L={8, 9}, and the other is S={6, 7}, L={1, 2}, and S+L={6, 7}. The reference starting point of the SLIV disclosed in this embodiment is the starting symbol of first available PUSCH, and at this point, S={0, 1}, L={1, 2}, and S+L={1, 2}, which can avoid the problem of the uniform rang of the SLIV caused by the reference starting point of the SLIV based on the starting/ending symbol of the PDCCH and the problem of excessive overhead caused by the reference starting point of the SLIV based on the slot boundary or the starting/ending symbol of the PDCCH.

Embodiment Four

Based on, but not limited to, the above-mentioned Embodiments 1 to 3, the starting symbol of the first available traffic channel is used as the reference starting point of the SLIV, where the traffic channel may be a physical downlink traffic channel or a physical uplink traffic channel, that is, a PDSCH or a PUSCH. The above method may also be described as a method of using the starting or ending symbol of the PDCCH (or the starting or ending symbol of a control resource set) plus an offset value as the reference starting point of the SLIV, where the offset value is a preset value, or a value indicated/configured by the base station, or a value reported by the terminal. Optionally, the value of the offset value includes, but is not limited to, at least one of the following: 0, a minimum interval delta between the starting symbol of the PDSCH and the ending symbol of the PDCCH, a beam switching threshold (for example, time duration for QCL), a maximum number of symbols earlier than the starting symbol of the PDCCH (note that the value of the offset value may be negative in this case), or a PUSCH minimum preparation time of N2 OFDM symbols. Optionally, based on but not limited to the above-mentioned manner of determining the value of the offset value, the value of the offset value is determined according to the terminal capability, that is, according to the UE capability. Therefore, the problem of excessive overhead caused by the reference starting point of the SLIV based on the slot boundary or the starting/ending symbol of the PDCCH and the ambiguity about the reference starting point when there may be multiple reference starting points are avoided.

Embodiment Five

For the current time-domain resource allocation, candidate allocation results are configured through a higher-layer signaling RRC, and one of the RRC-configured candidate allocation results is dynamically indicated through the DCI, so as to determine a time-domain resource of the current traffic channel. For the time-domain resource allocation of the PDSCH, RRC-configured parameters include: a slot offset k0, a SLIV or a starting point S and a length L independently indicated, and a PDSCH mapping type. For the time-domain resource allocation of the PUSCH, RRC-configured parameters include: a slot offset k2, a SLIV or a starting point S and a length L independently indicated, and a PUSCH mapping type. For the time-domain resource allocation of URLLC, given that the time-domain resources usually allocated are short, overhead controlled and allocation flexibility are required, and the URLLC usually supports multiple PDCCH transmission opportunities in a slot, one manner is to change the reference starting point of the SLIV in the PDSCH time-domain resource allocation from the slot boundary to the starting or ending symbol where the PDCCH is located, so as to save unnecessary RRC configuration and DCI overhead. For example, in FIG. 9, the RRC needs to configure 7 rows for time-domain resource occupancy in 7 slots such as {S=0, L=2}, {S=2, L=2}, {S=4, L=2}, {S=6, L=2}, {S=8, L=2}, {S=10, L=2}, and {S=12, L=2}. If the timing starting point is determined according to the starting symbol the PDCCH, the RRC only needs to configure 1 row for {S=0, L=2}, and at this point, if there is no possibility of other time-domain resource allocation, the DCI overhead is reduced from 3 bits to 0 bit. The scheduling limit of the above operation is that the PDSCH and the PDCCH may always start simultaneously by default. However, if there is more than one possibility of the reference starting point of the SLIV, for example, the reference starting point of the SLIV is the slot boundary or the starting symbol where PDCCH is located, it is necessary to determine an accurate and unambiguous the reference starting point of the SLIV, so that the terminal and the base station can be kept consistent in the understanding of the reference starting point of the SLIV to enable the terminal to receive data correctly.

There is more than one possibility of the reference starting point of the SLIV, and the reference starting point of the SLIV is determined in at least one of the following manners. In Manner one, the starting symbol of the PDCCH, or the ending symbol of the PDCCH, or the starting symbol of a control resource set (CORESET) where the PDCCH is located, or the ending symbol of a CORESET where the PDCCH is located is determined as the reference starting point of the SLIV. In Manner two, a slot boundary is determined as the reference starting point of the SLIV, where the slot boundary is a slot boundary determined according to the scheduling timing k0 or k2. In Manner three, the starting symbol of the first available traffic channel is determined as the reference starting point of the SLIV, where the traffic channel is a PDSCH or a PUSCH. In Manner four, the starting symbol of the PDCCH plus an offset value value is determined as the reference starting point of the SLIV. This embodiment discloses a method of determining the reference starting point of the SLIV according to a preset rule and/or through the notification of the base station. In an embodiment, one of Manner one and Manner two is adopted, and whether to adopt Manner one or Manner two is determined in at least one of the following manners.

In Manner 1, whether to adopt Manner one or Manner two is determined to be adopted according to the time domain location of the PDCCH. Optionally, when the PDCCH is located in the first three symbols in the slot or in a first time span in the slot, Manner one is adopted; otherwise, Manner two is adopted.

In Manner 2, whether to adopt Manner one or Manner two is determined according to the UE reporting capability. Optionally, when the UE reporting capability set (X, Y) includes (2, 2), for example, when the set (X, Y)={(2, 2), (4, 3), (7, 3)}, Manner one is adopted; otherwise, Manner two is adopted. It is noted that X represents the span separation, and Y represents the span length. Alternatively, one of Manner one and Manner two is directly reported by the UE to be adopted. Alternatively, when the UE reporting capability has capability 3-5 or 3-5a or 3-5b, Manner one is adopted; otherwise, Manner two is adopted.

In Manner 3, whether to adopt Manner one or Manner two is determined to be adopted according to the time span pattern. Optionally, whether to adopt Manner one or Manner two is determined according to the number of spans in the span pattern, and when the span pattern in the slot includes M spans or more, Manner one is adopted; otherwise, Manner two is adopted. M is a positive integer, optionally, M is one value in the set {1, 2, 3, 4, 5, 6, 7}, and further optionally, M is a preset value or a value notified by the base station or a value reported by the UE. Optionally, whether to adopt Manner one or Manner two is determined according to the maximum X in the span pattern, that is, according to the maximum span separation, and when the maximum X is less than N OFDM symbols, Manner one is adopted; otherwise, Manner two is adopted. N is a positive integer, optionally, N is one value in the set {2, 3, 4, 5, 6, 7, 8, 9, 10, 11, 12, 13, 14}, and further optionally, N is a preset value or a value notified by the base station or a value reported by the UE.

In Manner 4, whether to adopt Manner one or Manner two is determined according to the type of search space where the PDCCH is located. Optionally, when the search space type supports URLLC traffic, Manner one is adopted; otherwise, Manner two is adopted.

In Manner 5, whether to adopt Manner one or Manner two is determined according to the format of the DCI carried by the PDCCH. Optionally, when the DCI format is format X, Manner one is adopted; otherwise, Manner two is adopted, where Format X is a format defined for scheduling URLLC traffic.

In Manner 6, whether to adopt Manner one or Manner two is determined according to the value/type of the radio network temporary identifier (RNTI) scrambled by the PDCCH. Optionally, when the RNTI is a newly introduced RNTI type or value for URLLC traffic, Manner one is adopted; otherwise, Manner two is adopted.

In Manner 7, whether to adopt Manner one or Manner two is explicitly indicated or implicitly determined according to the bit field in the DCI carried by the PDCCH. Optionally, whether to adopt Manner one or Manner two is indicated by using an independent bit field (for example, a newly defined bit field, optionally with a size of 1 bit). Optionally, whether to adopt Manner one or Manner two is implicitly determined by using other bit fields in the DCI. For example, when the allocation granularity of the frequency-domain resource allocation type 1 is a granularity greater than one physical resource block (PRB), Manner one is adopted; otherwise, Manner two is adopted. In another example, when the maximum number of processes is less than 16, that is, when the process number indicates that the bit field is less than 4 bits, Manner one is adopted; otherwise, Manner two is adopted. In another example, when the modulation and coding scheme indication field is less than 5 bits, Manner one is adopted; otherwise, Manner two is adopted. For example, when the priority indication bit field is indicated to be a high priority or URLLC traffic, Manner one is adopted; otherwise, Manner two is adopted. It is noted that other bit fields may also be used to implicitly determine whether to adopt Manner one or Manner two. When a certain bit field is configured or designed for URLLC traffic, the bit field implicitly determines to adopt Manner one, otherwise, Manner two is adopted. Details will not be repeated herein.

In manner 8, whether to adopt Manner one or Manner two is determined according to the magnitude of the sub-carrier interval of the carrier where the PDCCH is located and the magnitude of the sub-carrier interval of the carrier where the traffic channel scheduled by the PDCCH is located. Optionally, when the magnitude of the sub-carrier interval of the carrier where the PDCCH is located is greater than the magnitude of the sub-carrier interval of the carrier where the traffic channel scheduled by the PDCCH is located, Manner one is adopted; otherwise, Manner two is adopted. Optionally, when the magnitude of the sub-carrier interval of the carrier where the PDCCH is located is greater than or equal to the magnitude of the sub-carrier interval of the carrier where the traffic channel scheduled by the PDCCH is located, Manner one is adopted; otherwise, Manner two is adopted. Optionally, when the magnitude of the sub-carrier interval of the carrier where the PDCCH is located is greater than or equal to the magnitude of the sub-carrier interval of the carrier where the traffic channel scheduled by the PDCCH is located, Manner one is adopted; when the magnitude of the sub-carrier interval of the carrier where the PDCCH is located is less than the magnitude of the sub-carrier interval of the carrier where the traffic channel scheduled by the PDCCH is located, Manner two is adopted; otherwise, whether to adopt Manner one or Manner two is determined in any one of Manners 1 to 7. It is noted that the candidate values of the magnitude of the sub-carrier interval are at least one of {15 kHz, 30 kHz, 60 kHz, 120 kHz, 240 kHz, 480 kHz}, and when the magnitudes are compared, the above values are ordered in the ascending order as 15 kHz, 30 kHz, 60 kHz, 120 kHz, 240 kHz, and 480 kHz.

It is to be noted that the above-mentioned manners are illustrated with Manner one and Manner two as examples, and similarly, the above-mentioned manners may also be illustrated through the determination of one of any two of Manners one, two, three and four and even other manners. Details will not be repeated herein.

Optionally, when the time-domain resource allocation is 0 bit, after the reference starting point of the SLIV for the time-domain resource allocation is determined in Manner one and Manner two, the value of the time-domain resource occupation duration L is determined in one of the following manners. The base station configures the same L value for Manner one and Manner two, that is, the same L value is used regardless of Manner one or Manner two. Alternatively, the base station configures L values for Manner one and Manner two respectively, and after whether to adopt Manner one and Manner two is determined, the base station determines the corresponding L value according to the determined manner.

Through the method described in this embodiment for determining the specific reference starting point of the SLIV when there is more than one type of reference starting points of the SLIV, the failure of correct data receiving caused by the inconsistent understanding between the base station and the terminal can be avoided, scheduling flexibility and the reduction of the time-domain resource allocation overhead can be ensured under different conditions, and ultra-reliable low-latency traffic transmission can be guaranteed.

Figure 14:
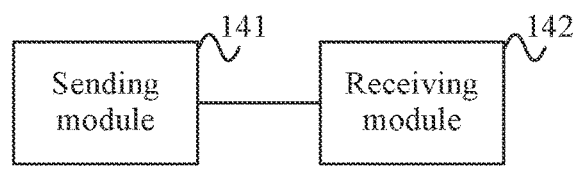
FIG. 14 is a structural schematic diagram of an uplink information feedback resource determination device according to an embodiment.

FIG. 14 is a structural schematic diagram of an uplink information feedback resource determination device according to an embodiment. As shown in FIG. 14, the uplink information feedback resource determination device provided by this embodiment includes a sending module 141 and a receiving module 142. The sending module 141 is configured to send DCI, to a terminal, where the DCI is used for scheduling downlink service data and for requesting the terminal to feed back CSI, and the DCI includes indication information of both a PUCCH resource occupied by the CSI and a PUCCH resource occupied by HARQ information for the downlink service data. The receiving module 142 is configured to receive the CSI and the HARQ information sent by the terminal, where the PUCCH resource occupied by the CSI and the PUCCH resource occupied by the HARQ information are determined according to the indication information in the DCI.

The uplink information feedback resource determination device provided by this embodiment is applied to the uplink information feedback resource determination method of the embodiment shown in FIG. 1. The implementation principle and technical effect of the uplink information feedback resource determination device provided by this embodiment are similar to those of the uplink information feedback resource determination method of the embodiment shown in FIG. 1, and details are not repeated here.

Figure 15:
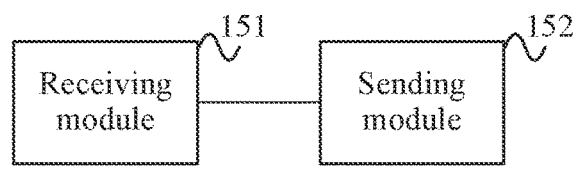
FIG. 15 is a structural schematic diagram of another uplink information feedback resource determination device according to an embodiment.

FIG. 15 is a structural schematic diagram of another uplink information feedback resource determination device according to an embodiment. As shown in FIG. 15, the uplink information feedback resource determination device includes a receiving module 151 and a sending module 152. The receiving module 151 is configured to receive DCI sent by a base station, where the DCI is used for scheduling downlink service data and requesting feedback of CSI, and the DCI includes indication information of a PUCCH resource occupied by the CSI and indication information of a PUCCH resource occupied by HARQ information of the downlink service data. The sending module 152 is configured to feed back the CSI and the HARQ information to the base station, where the PUCCH resource occupied by the CSI and the PUCCH resource occupied by the HARQ information are determined according to the indication information in the DCI.

The uplink information feedback resource determination device provided by this embodiment is applied to the uplink information feedback resource determination method of the embodiment shown in FIG. 5. The implementation principle and technical effect of the uplink information feedback resource determination device provided by this embodiment are similar to those of the uplink information feedback resource determination method of the embodiment shown in FIG. 5, and details are not repeated here.

The embodiments of the present application further provide an uplink information feedback resource determination device which includes a sending module. The sending module is configured to send an uplink DCI or a downlink DCI to a terminal, where the uplink DCI or the downlink DCI is used for indicating an SRS request and a CSI request, and the SRS request and the CSI request are requested according to the same request state or two different request states.

The embodiments of the present application further provide an uplink information feedback resource determination device which includes a receiving module and a sending module. The receiving module is configured to receive an uplink DCI or a downlink DCI sent by a base station, where the uplink DCI or the downlink DCI is used for indicating an SRS request and a CSI request, and the SRS request and the CSI request share a bit field. The sending module is configured to send an SRS and CSI corresponding to a state of the bit field shared by the SRS request and the CSI request to the base station.

It is to be understood by those skilled in the art that the term "user terminal" covers any suitable type of wireless user devices, for example, a mobile phone, a portable data processing apparatus, a portable web browser, or a vehicle-mounted mobile station.

In general, various embodiments of the present application may be implemented in hardware, a dedicated circuit, software, logic, or any combination thereof. For example, some aspects may be implemented in hardware while other aspects may be implemented in firmware or software that may be executed by a controller, a microprocessor, or other computing apparatuses, which is not limited thereto.

The embodiments of the present application may be implemented by a data processor of a mobile apparatus executing computer program information, such as in a processor entity, or by hardware, or by a combination of software and hardware. The computer program information may be assembly information, information set architecture (ISA) information, machine information, machine-related information, microcodes, firmware information, state setting data, or source codes or object codes written in any combination of one or more programming languages.

A block diagram of any logic flow in drawings of the present application may represent program steps, or may represent interconnected logic circuits, modules, and functions, or may represent a combination of program steps, logic circuits, modules, and functions. The computer programs may be stored in a memory. The memory may be of any type suitable for a local technical environment and may be implemented using any suitable data storage technology, such as, but not limited to, a read-only memory (ROM), a random-access memory (RAM) and an optical memory device and system (digital video disc (DVD) or compact disc (CD)). The computer-readable storage medium may include a non-transitory storage medium. The data processor may be of any type suitable to the local technical environment which, such as but not limited to, a general-purpose computer, a special-purpose computer, a microprocessor, a digital signal processing (DSP), an application-specific integrated circuit (ASIC), a field-programmable gate array (FGPA), and a processor based on a multi-core processor architecture.

What is claimed is:

1. An uplink information feedback resource determination method, comprising:
sending downlink control information (DCI), to a terminal, wherein the DCI is used for scheduling downlink service data and for requesting the terminal to feed back channel state information (CSI), and the DCI comprises indication information of both a physical uplink control channel (PUCCH), resource occupied by the CSI and a PUCCH resource occupied by a hybrid automatic repeat request (HARQ), information for the downlink service data; and
receiving the CSI and the HARQ information sent by the terminal, wherein the PUCCH resource occupied by the CSI and the PUCCH resource occupied by the HARQ information are determined according to the indication information in the DCI,
wherein the sending the DCI to the terminal comprises:
sending X DCIs to the terminal, wherein the X DCIs are used for scheduling downlink service data and Y DCIs in the X DCIs are used for requesting the terminal to feed back CSI, wherein X≥1, X≥Y≥0, X and Y are integers, CSIs and HARQ information corresponding to the X DCIs are fed back using a same PUCCH resource, selection of a location of the PUCCH resource used by the CSIs and the HARQ information corresponding to the X DCIs needs to satisfy a minimum feedback timing of the CSIs and the HARQ information corresponding to the X DCIs, and a PUCCH resource set where the PUCCH resource is located is determined according to a total feedback overhead of the CSIs and the HARQ information corresponding to the X DCIs; and
wherein the receiving the CSI and the HARQ information sent by the terminal comprises:
receiving the CSIs and the HARQ information corresponding to the X DCIs sent by the terminal on the same PUCCH resource,
wherein the sending X DCIs to the terminal, wherein the X DCIs are used for scheduling downlink service data and Y DCIs in the X DCIs are used for requesting the terminal to feed back CSI, comprises:
sending the X DCIs to the terminal, wherein the X DCIs are used for scheduling downlink service data and the X DCIs all are used for requesting the terminal to feed back CSI;

sending the X DCIs to the terminal, wherein the X DCIs are used for scheduling downlink service data, and in a case where an X-th DCI is used for requesting the terminal to feed back CSI, the X DCIs all are used for requesting the terminal to feed back CSI, or in a case where the X-th DCI is not used for requesting the terminal to feed back CSI, none of the X DCIs are used for requesting the terminal to feed back CSI;

sending the X DCIs to the terminal, wherein the X DCIs are used for scheduling downlink service data and the terminal is configured to respond to a CSI feedback request of one of the X DCIs only; or sending the X DCIs to the terminal, wherein the X DCIs are used for scheduling downlink service data and Y DCIs in the X DCIs are used for requesting the terminal to feed back DCI, the X DCIs comprise CSI feedback statistical information, and the CSI feedback statistical information is used for enabling the terminal to determine a quantity of DCIs used for requesting the terminal to feed back CSI in the X DCIs sent by a base station.

2. The method of claim 1, wherein the DCI comprises indication information of both a scheduling unit where the HARQ information is located, and a scheduling unit where the CSI is located, and indication information of both a PUCCH resource used by the HARQ information in the scheduling unit, and a PUCCH resource used by the CSI in the scheduling unit, and wherein the scheduling unit where the CSI is located is different from the scheduling unit where the HARQ information is located.

3. The method of claim 2, wherein the DCI comprises a timing interval between the scheduling unit where the HARQ information is located and a scheduling unit where the downlink service data reception ends, an offset value, a PUCCH resource index of the PUCCH resource used by the HARQ information in the scheduling unit in a PUCCH resource set, and a PUCCH resource index of the PUCCH resource used by the CSI in the scheduling unit in a PUCCH resource set, and wherein the PUCCH resource set used by the HARQ information in the scheduling unit and the PUCCH resource set used by the CSI in the scheduling unit are respectively determined according to an overhead of the HARQ information and an overhead of the CSI, and the scheduling unit where the CSI is located is the scheduling unit where the HARQ information is located plus the offset value, wherein the PUCCH resource index of the PUCCH resource used by the CSI in the scheduling unit in the PUCCH resource set is the PUCCH resource index of the PUCCH resource used by the HARQ information in the scheduling unit in the PUCCH resource set plus the offset value.

4. The method of claim 2, wherein the DCI comprises a timing interval between the scheduling unit where the HARQ information is located and a scheduling unit where the downlink service data reception ends, a PUCCH resource index of the PUCCH resource used by the HARQ information in the scheduling unit in a PUCCH resource set, and a PUCCH resource index of the PUCCH resource used by the CSI in the scheduling unit in a PUCCH resource set, and the PUCCH resource set used by the HARQ information in the scheduling unit and the PUCCH resource set used by the CSI in the scheduling unit are respectively determined according to an overhead of the HARQ information and an overhead of the CSI; and wherein the method further comprises:
configuring an offset value for the terminal through a radio resource control, RRC, signaling, wherein the scheduling unit where the CSI is located is the scheduling unit where the HARQ information is located plus the offset value,
wherein the PUCCH resource index of the PUCCH resource used by the CSI in the scheduling unit in the PUCCH resource set is the PUCCH resource index of the PUCCH resource used by the HARQ information in the scheduling unit in the PUCCH resource set plus the offset value.

5. The method of claim 2, wherein the DCI comprises a timing interval between the scheduling unit where the HARQ information is located and a scheduling unit where the downlink service data reception ends, a timing interval between the scheduling unit where the CSI is located and the scheduling unit where the downlink service data reception ends, a PUCCH resource index of the PUCCH resource used by the HARQ information in the scheduling unit in a PUCCH resource set, and a PUCCH resource index of the PUCCH resource used by the CSI in the scheduling unit in a PUCCH resource set, and the PUCCH resource set used by the HARQ information in the scheduling unit and the PUCCH resource set used by the CSI in the scheduling unit are respectively determined according to an overhead of the HARQ information and an overhead of the CSI.

6. The method of claim 2, wherein the DCI comprises a timing interval between the scheduling unit where the HARQ information is located and a scheduling unit where the downlink service data reception ends, a PUCCH resource index of the PUCCH resource used by the HARQ information in the scheduling unit in a PUCCH resource set, and a PUCCH resource index of the PUCCH resource used by the CSI in the scheduling unit in a PUCCH resource set, and the PUCCH resource set used by the HARQ information in the scheduling unit and the PUCCH resource set used by the CSI in the scheduling unit are respectively determined according to an overhead of the HARQ information and an overhead of the CSI; and wherein the method further comprises:
configuring a timing parameter set for the terminal through an RRC signaling, wherein the scheduling unit where the CSI is located is obtained by indexing in the timing parameter set with the timing interval between the scheduling unit where the HARQ information is located and the scheduling unit where the downlink service data reception ends as an index.

7. The method of claim 1, wherein the DCI comprises indication information of both a scheduling unit where the HARQ information is located, and a scheduling unit where the CSI is located, and indication information of both a PUCCH resource used by the HARQ information in the scheduling unit, and a PUCCH resource used by the CSI in the scheduling unit, and the scheduling unit where the CSI is located is the same as the scheduling unit where the HARQ information is located, or wherein the DCI comprises a timing interval between the scheduling unit where the HARQ information is located and a scheduling unit where the downlink service data reception ends, a PUCCH resource index of the PUCCH resource used by the HARQ information in the scheduling unit in a PUCCH resource set, and a PUCCH resource index of the PUCCH resource used by the CSI in the scheduling unit in a PUCCH resource set, the PUCCH resource set used by the HARQ information in the scheduling unit is determined according to an overhead of the HARQ information, and the PUCCH resource set used by the CSI in the scheduling unit is configured according to an RRC signaling.

8. The method of claim 7, wherein the DCI comprises a timing interval between the scheduling unit where the HARQ information is located and a scheduling unit where the downlink service data reception ends, a PUCCH resource index of the PUCCH resource used by the HARQ information in the scheduling unit in a PUCCH resource set, and a PUCCH resource index of the PUCCH resource used by the CSI in the scheduling unit in a PUCCH resource set, the PUCCH resource set used by the HARQ information in the scheduling unit is determined according to an overhead of the HARQ information, and the PUCCH resource set used by the CSI in the scheduling unit is configured according to an RRC signaling,
- wherein the PUCCH resource index of the PUCCH resource used by the CSI in the scheduling unit in the PUCCH resource set is the same as the PUCCH resource index of the PUCCH resource used by the HARQ information in the scheduling unit in the PUCCH resource set, and
- wherein the DCI further comprises an offset value, and the PUCCH resource index of the PUCCH resource used by the CSI in the scheduling unit in the PUCCH resource set is the PUCCH resource index of the PUCCH resource used by the HARQ information in the scheduling unit in the PUCCH resource set plus the offset value; or
- an offset value is configured for the terminal through the RRC signaling, and the PUCCH resource index of the PUCCH resource used by the CSI in the scheduling unit in the PUCCH resource set is the PUCCH resource index of the PUCCH resource used by the HARQ information in the scheduling unit in the PUCCH resource set plus the offset value.

9. The method of claim 7, wherein the DCI comprises a timing interval between the scheduling unit where the HARQ information is located and a scheduling unit where the downlink service data reception ends, a PUCCH resource index of the PUCCH resource used by the HARQ information in the scheduling unit in a PUCCH resource set, and a PUCCH resource index of the PUCCH resource used by the CSI in the scheduling unit in a PUCCH resource set, the PUCCH resource set used by the HARQ information in the scheduling unit is determined according to an overhead of the HARQ information, and the PUCCH resource set used by the CSI in the scheduling unit is selected from the PUCCH resource set used by the HARQ information according to an overhead of the CSI,
- wherein the DCI further comprises an offset value, and the PUCCH resource index of the PUCCH resource used by the CSI in the scheduling unit in the PUCCH resource set is the PUCCH resource index of the PUCCH resource used by the HARQ information in the scheduling unit in the PUCCH resource set plus the offset value; or
- an offset value is configured for the terminal through the RRC signaling, and the PUCCH resource index of the PUCCH resource used by the CSI in the scheduling unit in the PUCCH resource set is the PUCCH resource index of the PUCCH resource used by the HARQ information in the scheduling unit in the PUCCH resource set plus the offset value.

10. The method of claim 7, wherein the DCI comprises a timing interval between the scheduling unit where the HARQ information is located and a scheduling unit where the downlink service data reception ends, a PUCCH resource index of the PUCCH resource used by the HARQ information in the scheduling unit in a PUCCH resource set, and a PUCCH resource index of the PUCCH resource used by the CSI in the scheduling unit in a PUCCH resource set, and the PUCCH resource set used by the HARQ information in the scheduling unit and the PUCCH resource set used by the CSI in the scheduling unit are respectively determined according to an overhead of the HARQ information and an overhead of the CSI,
- wherein the PUCCH resource index of the PUCCH resource used by the CSI in the scheduling unit in the PUCCH resource set is the same as the PUCCH resource index of the PUCCH resource used by the HARQ information in the scheduling unit in the PUCCH resource set, and
- wherein the DCI further comprises an offset value, and the PUCCH resource index of the PUCCH resource used by the CSI in the scheduling unit in the PUCCH resource set is the PUCCH resource index of the PUCCH resource used by the HARQ information in the scheduling unit in the PUCCH resource set plus the offset value; or
- an offset value is configured for the terminal through an RRC signaling, and the PUCCH resource index of the PUCCH resource used by the CSI in the scheduling unit in the PUCCH resource set is the PUCCH resource index of the PUCCH resource used by the HARQ information in the scheduling unit in the PUCCH resource set plus the offset value.

11. The method of claim 7, wherein the DCI comprises a timing interval between the scheduling unit where the HARQ information is located and a scheduling unit where the downlink service data reception ends, a PUCCH resource index of the PUCCH resource used by the HARQ information in the scheduling unit in a PUCCH resource set, and a PUCCH resource index of the PUCCH resource used by the CSI in the scheduling unit in a PUCCH resource set, and the PUCCH resource set used by the HARQ information in the scheduling unit and the PUCCH resource set used by the CSI in the scheduling unit are determined according to a larger one between an overhead of the HARQ information and an overhead of the CSI,
- wherein the DCI further comprises an offset value, and the PUCCH resource index of the PUCCH resource used by the CSI in the scheduling unit in the PUCCH resource set is the PUCCH resource index of the PUCCH resource used by the HARQ information in the scheduling unit in the PUCCH resource set plus the offset value; or
- an offset value is configured for the terminal through an RRC signaling, and the PUCCH resource index of the PUCCH resource used by the CSI in the scheduling unit in the PUCCH resource set is the PUCCH resource index of the PUCCH resource used by the HARQ information in the scheduling unit in the PUCCH resource set plus the offset value, or
- wherein the DCI comprises a PUCCH resource index of the PUCCH resource used by the HARQ information in the scheduling unit in a PUCCH resource set, and the PUCCH resource used by the CSI in the scheduling unit is adjacent to and does not overlap the PUCCH resource used by the HARQ information in the scheduling unit.

12. The method of claim 2, wherein a delay between the PUCCH resource used by the CSI in the scheduling unit and a scheduling unit used by the DCI is greater than or equal to a minimum delay required by the CSI feedback.

13. The method of claim 2, wherein the scheduling unit comprises at least one of: a subframe, a slot, a non-slot, a short transmission time interval, or a symbol.

14. An uplink information feedback resource determination method, comprising:
receiving downlink control information (DCI), sent by a base station, wherein the DCI is used for scheduling downlink service data and requesting feedback of channel state information (CSI), and the DCI comprises indication information of both a physical uplink control channel (PUCCH), resource occupied by the CSI and a PUCCH resource occupied by a hybrid automatic repeat request (HARQ), information for the downlink service data; and
feeding back the CSI and the HARQ information to the base station, wherein the PUCCH resource occupied by the CSI and the PUCCH resource occupied by the HARQ information are determined according to the indication information in the DCI,
wherein the receiving the DCI sent by the base station comprises:
receiving X DCIs sent by the base station, wherein the X DCIs are used for scheduling downlink service data and Y DCIs in the X DCIs are used for requesting a terminal to feed back CSI, wherein X≥1, X≥Y≥0, X and Y are integers, CSIs and HARQ information corresponding to the X DCIs are fed back using a same PUCCH resource, selection of the PUCCH resource used by the CSIs and the HARQ information corresponding to the X DCIs needs to satisfy a minimum feedback timing of the CSIs and the HARQ information corresponding to the X DCIs, and a PUCCH resource set where the PUCCH resource is located is determined according to a total feedback overhead of the CSIs and the HARQ information corresponding to the X DCIs; and
wherein the feeding back the CSI and the HARQ information to the base station comprises:
sending the CSI and the HARQ information corresponding to the X DCIs to the base station on the same PUCCH resource,
wherein the receiving X DCIs sent by the base station, wherein the X DCIs are used for scheduling downlink service data and Y DCIs in the X DCIs are used for requesting a terminal to feed back CSI, comprises:
receiving the X DCIs sent by the base station, wherein the X DCIs are used for scheduling downlink service data and the X DCIs all used for requesting the terminal to feed back CSI;
receiving the X DCIs sent by the base station, wherein the X DCIs are used for scheduling downlink service data, in a case where an X-th DCI is used for requesting the terminal to feed back CSI, the X DCIs all are used for requesting the terminal to feed back CSI, or in a case where the X-th DCI is not used for requesting the terminal to feed back CSI, none of the X DCIs are used for requesting the terminal to feed back CSI;
receiving the X DCIs sent by the base station, wherein the X DCIs are used for scheduling downlink service data and the terminal is configured to respond to a CSI feedback request of one of the X DCIs only; or
receiving the X DCIs sent by the base station, wherein the X DCIs are used for scheduling downlink service data and Y DCIs in the X DCIs are used for requesting the terminal to feed back DCI, the X DCIs comprise CSI feedback statistical information, and the CSI feedback statistical information is used for enabling the terminal to determine a quantity of DCIs used for requesting the terminal to feed back CSI in the X DCIs sent by the base station.

15. The method of claim 14, wherein the DCI comprises indication information of a scheduling unit where the HARQ information is located, and a scheduling unit where the CSI is located, and indication information of both a PUCCH resource used by the HARQ information in the scheduling unit, and a PUCCH resource used by the CSI in the scheduling unit, and the scheduling unit where the CSI is located is different from the scheduling unit where the HARQ information is located.

16. The method of claim 15, wherein the DCI comprises a timing interval between the scheduling unit where the HARQ information is located and a scheduling unit where the downlink service data reception ends, an offset value, a PUCCH resource index of the PUCCH resource used by the HARQ information in the scheduling unit in a PUCCH resource set, and a PUCCH resource index of the PUCCH resource used by the CSI in the scheduling unit in a PUCCH resource set, the PUCCH resource set used by the HARQ information in the scheduling unit and the PUCCH resource set used by the CSI in the scheduling unit are respectively determined according to an overhead of the HARQ information and an overhead of the CSI, and the scheduling unit where the CSI is located is the scheduling unit where the HARQ information is located plus the offset value,
wherein the PUCCH resource index of the PUCCH resource used by the CSI in the scheduling unit in the PUCCH resource set is the PUCCH resource index of the PUCCH resource used by the HARQ information in the scheduling unit in the PUCCH resource set plus the offset value.

17. The method of claim 15, wherein the DCI comprises a timing interval between the scheduling unit where the HARQ information is located and a scheduling unit where the downlink service data reception ends, a PUCCH resource index of the PUCCH resource used by the HARQ information in the scheduling unit in a PUCCH resource set, and a PUCCH resource index of the PUCCH resource used by the CSI in the scheduling unit in a PUCCH resource set, and the PUCCH resource set used by the HARQ information in the scheduling unit and the PUCCH resource set used by the CSI in the scheduling unit are respectively determined according to an overhead of the HARQ information and an overhead of the CSI; and
wherein the method further comprises:
receiving, through a radio resource control, RRC, signaling, an offset value configured by the base station, wherein the scheduling unit where the CSI is located is the scheduling unit where the HARQ information is located plus the offset value,
wherein the PUCCH resource index of the PUCCH resource used by the CSI in the scheduling unit in the PUCCH resource set is the PUCCH resource index of the PUCCH resource used by the HARQ information in the scheduling unit in the PUCCH resource set plus the offset value.

18. An uplink information feedback resource determination device, comprising:
a processor and a memory storing processor-executable instructions which, when executed by the processor, are configured to send downlink control information (DCI), to a terminal, wherein the DCI is used for scheduling downlink service data and for requesting the terminal to feed back channel state information (CSI), and the DCI comprises indication information of both a physical uplink control channel (PUCCH), resource occupied by the CSI and a PUCCH resource occupied by a hybrid automatic repeat request (HARQ), information for the downlink service data; and receive the CSI and the HARQ information sent by the terminal, wherein the PUCCH resource occupied by the CSI and the PUCCH resource occupied by the HARQ information are determined according to the indication information in the DCI, wherein to send the DCI to the terminal comprises:

sending X DCIs to the terminal, wherein the X DCIs are used for scheduling downlink service data and Y DCIs in the X DCIs are used for requesting the terminal to feed back CSI, wherein X≥1, X≥Y≥0, X and Y are integers, CSIs and HARQ information corresponding to the X DCIs are fed back using a same PUCCH resource, selection of a location of the PUCCH resource used by the CSIs and the HARQ information corresponding to the X DCIs needs to satisfy a minimum feedback timing of the CSIs and the HARQ information corresponding to the X DCIs, and a PUCCH resource set where the PUCCH resource is located is determined according to a total feedback overhead of the CSIs and the HARQ information corresponding to the X DCIs; and wherein to receive the CSI and the HARQ information sent by the terminal comprises:

receiving the CSIs and the HARQ information corresponding to the X DCIs sent by the terminal on the same PUCCH resource, wherein the sending X DCIs to the terminal, wherein the X DCIs are used for scheduling downlink service data and Y DCIs in the X DCIs are used for requesting the terminal to feed back CSI, comprises:

sending the X DCIs to the terminal, wherein the X DCIs are used for scheduling downlink service data and the X DCIs all are used for requesting the terminal to feed back CSI;

sending the X DCIs to the terminal, wherein the X DCIs are used for scheduling downlink service data, and in a case where an X-th DCI is used for requesting the terminal to feed back CSI, the X DCIs all are used for requesting the terminal to feed back CSI, or in a case where the X-th DCI is not used for requesting the terminal to feed back CSI, none of the X DCIs are used for requesting the terminal to feed back CSI;

sending the X DCIs to the terminal, wherein the X DCIs are used for scheduling downlink service data and the terminal is configured to respond to a CSI feedback request of one of the X DCIs only; or sending the X DCIs to the terminal, wherein the X DCIs are used for scheduling downlink service data and Y DCIs in the X DCIs are used for requesting the terminal to feed back DCI, the X DCIs comprise CSI feedback statistical information, and the CSI feedback statistical information is used for enabling the terminal to determine a quantity of DCIs used for requesting the terminal to feed back CSI in the X DCIs sent by a base station.

19. An uplink information feedback resource determination device, comprising:

a processor and a memory storing processor-executable instructions which, when executed by the processor, are configured to perform the uplink information feedback resource determination method of claim 14.

\* \* \* \* \*